(12) United States Patent
Perrin et al.

(10) Patent No.: US 12,250,065 B2
(45) Date of Patent: Mar. 11, 2025

(54) METHODS AND APPARATUS TO IMPROVE MEDIA MONITORING BY ADJUSTING FOR CO-VIEWING

(71) Applicant: The Nielsen Company (US), LLC, New York, NY (US)

(72) Inventors: Elaine Perrin, Oldsmar, FL (US); Oana Monica Dan, Chatham, NJ (US); Lindsey Rabhan, San Francisco, CA (US); Matthew Vanlandeghem, Schaumburg, IL (US)

(73) Assignee: The Nielsen Company (US), LLC, New York, NY (US)

(*) Notice: Subject to any disclaimer, the term of this patent is extended or adjusted under 35 U.S.C. 154(b) by 989 days.

(21) Appl. No.: 15/799,791

(22) Filed: Oct. 31, 2017

(65) Prior Publication Data
US 2018/0198543 A1    Jul. 12, 2018

Related U.S. Application Data

(60) Provisional application No. 62/445,216, filed on Jan. 11, 2017.

(51) Int. Cl.
*G06Q 10/00* (2023.01)
*G06Q 30/0201* (2023.01)
(Continued)

(52) U.S. Cl.
CPC ......... *H04H 60/22* (2013.01); *G06Q 30/0201* (2013.01); *G06Q 30/0203* (2013.01);
(Continued)

(58) Field of Classification Search
CPC ....... G06Q 30/02–0203; G06Q 30/0245–0246
See application file for complete search history.

(56) References Cited

U.S. PATENT DOCUMENTS

| 8,739,197 B1* | 5/2014 | Pecjak | H04N 21/2407 |
| | | | 725/9 |
| 9,743,141 B2* | 8/2017 | Sheppard | H04N 21/25883 |
(Continued)

FOREIGN PATENT DOCUMENTS

KR      20160117544      10/2016

OTHER PUBLICATIONS

Mora, J. D., Ho, J., & Krider, R. E. (2012). Television co-viewing in Mexico: An assessment on people meter data. Journal of Broadcasting and Electronic Media, 55 (4), 448-469. (Year: 2011).*

(Continued)

*Primary Examiner* — Hafiz A Kassim
*Assistant Examiner* — Scott M Ross

(57) ABSTRACT

Methods, apparatus, and articles of manufacture are disclosed. An example apparatus includes a co-viewing calculator to calculate a co-viewing factor corresponding to a demographic of panelists based on exposure information, an exposure time calculator to calculate a number of census co-viewer exposure minutes based on the co-viewing factor, a data aggregator to determine an aggregate exposure time total based on census exposure information and the number of census co-viewer exposure minutes, and a report generator to generate a report including the aggregate exposure time total.

19 Claims, 11 Drawing Sheets

(51) Int. Cl.
*G06Q 30/0203* (2023.01)
*G06Q 30/0242* (2023.01)
*H04H 60/22* (2008.01)
*H04H 60/45* (2008.01)
*H04N 21/25* (2011.01)
*H04N 21/442* (2011.01)
*H04N 21/258* (2011.01)
*H04W 4/18* (2009.01)

(52) U.S. Cl.
CPC ......... *G06Q 30/0245* (2013.01); *H04H 60/45* (2013.01); *H04N 21/252* (2013.01); *H04N 21/44218* (2013.01); *H04N 21/25891* (2013.01); *H04W 4/18* (2013.01)

(56) References Cited

U.S. PATENT DOCUMENTS

| | | | | |
|---|---|---|---|---|
| 9,749,688 | B1* | 8/2017 | West | H04N 21/44213 |
| 10,210,459 | B2* | 2/2019 | Sheppard | H04H 60/45 |
| 2007/0011040 | A1* | 1/2007 | Wright | H04H 60/52 |
| | | | | 725/46 |
| 2008/0148309 | A1 | 6/2008 | Wilcox et al. | |
| 2012/0213410 | A1* | 8/2012 | Ramaswamy | H04N 21/433 |
| | | | | 382/103 |
| 2015/0262207 | A1* | 9/2015 | Rao | G06Q 30/0241 |
| | | | | 705/7.32 |
| 2016/0249098 | A1* | 8/2016 | Pecjak | H04N 21/44224 |
| 2016/0269766 | A1* | 9/2016 | Levande | H04N 21/6582 |
| 2017/0006342 | A1* | 1/2017 | Nagaraja Rao | H04N 21/44222 |
| 2017/0171581 | A1* | 6/2017 | Mulligan | G01N 15/147 |
| 2018/0176622 | A1* | 6/2018 | Sheppard | H04N 21/252 |
| 2019/0313153 | A1* | 10/2019 | Pecjak | H04N 21/812 |

OTHER PUBLICATIONS

"Communication » Research Methods » People-Meter"; pp. 1-9, Iresearch.net; http://communication.iresearchnet.com/research-methods/people-meter/ (Year: 2022).*

European History Online, "Media Genres" by Jürgen Wilke, Published: Dec. 3, 2010, http://ieg-ego.eu/en/threads/backgrounds/media-genres (Year: 2010).*

CTV Co-viewing Rate Estimation Using Online Surveys, Rachel Fan Wei Liu, Jon Vaver, Google LLC (2021) (Year: 2021).*

Mark Braff, "Council for Research Excellence Unveils Second Phase of "The Mind of the Viewer" Study at ARF Annual Conference" (Mar. 21, 2017), Vocus PRW Holdings, LLC. Council for Research Excellence, 4 pages.

Luzia Helfer et al., "Bowling Alone, Watching Together? Structural Explanations of Social TV Viewing from 1990 to 2010" (2015), Leiden University, Department of Political Science, 27 pages.

Kumar Rao, et al., "Co-Viewing on OTT Devices: Similarities and Differences" (Feb. 2017), Nielsen Journal of Measurement, vol. 1, Issue 3, 12 pages.

Elizabeth A. Vandewater et al., "Measuring Children's Media Use in the Digital Age" (Apr. 1, 2009), American Behavioral Scientist, vol. 52, Issue 8, pp. 1152-1176, doi: 10.1177/0002764209331539, 18 pages.

Diego Vasquez, "Latest Issue with Nielsen's TV Nos. Distractions" (Sep. 20, 2016), MediaLife, Research, 4 pages.

Wikipedia, "People Meter" (Jun. 14, 2017), Wikipedia the free encyclopedia, 2 pages.

Spoentgen et al., "Collapsed-Level Deduplication Based on a Data Matching System", U.S. Appl. No. 15/338,301, filed Oct. 28, 2016, 56 pages.

* cited by examiner

FIG. 5

Table A (500):

| PRIMARY DEMO | GENRE | TOTAL IMPs | EXPOSURE MIN |
|---|---|---|---|
| FEMALE 2-5 | CHILDREN'S | 100 | 200 |
| MALE 65+ | CHILDREN'S | 500 | 1000 |
| FEMALE 2-5 | COMEDY | 200 | 400 |
| MALE 65+ | COMEDY | 800 | 1600 |
| . | . | | |
| . | . | | |
| FEMALE 2-5 | VARIETY | 150 | 300 |
| MALE 65+ | VARIETY | 600 | 1200 |
| FEMALE 2-5 | ALL GENRE | 800 | 1600 |
| MALE 65+ | ALL GENRE | 2500 | 5000 |

Table B (502):

| GENRE | PRIMARY DEMO | SECONDARY DEMO | CO-VIEWER IMPs | CO-VIEWER EXPOSURE MIN |
|---|---|---|---|---|
| CHILDREN'S | FEMALE 2-5 | FEMALE 2-5 | 9 | 18 |
| CHILDREN'S | FEMALE 2-5 | MALE 65+ | 2 | 4 |
| . | . | | | |
| CHILDREN'S | MALE 65+ | FEMALE 2-5 | 11 | 22 |
| CHILDREN'S | MALE 65+ | MALE 65+ | 1 | 2 |
| . | . | | | |
| ALL GENRE | FEMALE 2-5 | FEMALE 2-5 | 20 | 40 |
| ALL GENRE | FEMALE 2-5 | MALE 65+ | 10 | 20 |
| ALL GENRE | MALE 65+ | FEMALE 2-5 | 25 | 50 |
| ALL GENRE | MALE 65+ | MALE 65+ | 5 | 10 |

TABLE C — 600

| GENRE | PRIMARY DEMO | TOTAL IMPs | EXPOSURE MIN |
|---|---|---|---|
| CHILDREN'S | F 2-34 | 200 | 400 |
| CHILDREN'S | F 35+ | 400 | 800 |
| CHILDREN'S | M 2-34 | 200 | 400 |
| CHILDREN'S | M 35+ | 500 | 1000 |

TABLE D — 602

| GENRE | PRIMARY DEMO | SECONDARY DEMO | CO-VIEWER IMPs | CO-VIEWER EXPOSURE MIN |
|---|---|---|---|---|
| CHILDREN'S | F 2-34 | F 2-34 | 8 | 16 |
| CHILDREN'S | F 2-34 | F 35+ | 5 | 10 |
| CHILDREN'S | F 2-34 | M 2-34 | 6 | 12 |
| CHILDREN'S | F 2-34 | M 35+ | 3 | 6 |
| CHILDREN'S | F 35+ | F 2-34 | 8 | 16 |
| CHILDREN'S | F 35+ | M 2-34 | 3 | 6 |
| CHILDREN'S | F 35+ | M 35+ | 7 | 14 |
| CHILDREN'S | M 2-34 | F 2-34 | 3 | 6 |
| CHILDREN'S | M 2-34 | F 35+ | 5 | 10 |
| CHILDREN'S | M 2-34 | M 2-34 | 3 | 6 |
| CHILDREN'S | M 2-34 | M 35+ | 6 | 12 |
| CHILDREN'S | M 35+ | F 2-34 | 2 | 4 |
| CHILDREN'S | M 35+ | F 35+ | 6 | 12 |
| CHILDREN'S | M 35+ | M 2-34 | 2 | 4 |
| CHILDREN'S | M 35+ | M 2-34 | 6 | 12 |
| CHILDREN'S | M 35+ | M 35+ | 1 | 2 |

TABLE G — 800

| GENRE | DEMO | INITIAL DP IMP | INITIAL DP EXP MIN |
|---|---|---|---|
| CHILDREN'S | F 2-34 | 20000 | 40000 |
| CHILDREN'S | F 35+ | 40000 | 80000 |
| CHILDREN'S | M 2-34 | 25000 | 50000 |
| CHILDREN'S | M 35+ | 45000 | 90000 |

+

TABLE H — 802

| GENRE | DEMO | DP CO-VIEWED IMP | DP CO-VIEWED EXP MIN |
|---|---|---|---|
| CHILDREN'S | F 2-34 | 2765 | 5530 |
| CHILDREN'S | F 35+ | 1355 | 2710 |
| CHILDREN'S | M 2-34 | 2590 | 5180 |
| CHILDREN'S | M 35+ | 940 | 1880 |

=

TABLE J — 900

| GENRE | DEMO | ADJUSTED DP IMP | ADJUSTED DP EXP MIN |
|---|---|---|---|
| CHILDREN'S | F 2-34 | 22765 | 45530 |
| CHILDREN'S | F 35+ | 41355 | 82710 |
| CHILDREN'S | M 2-34 | 27590 | 55180 |
| CHILDREN'S | M 35+ | 45940 | 91880 |

METHODS AND APPARATUS TO IMPROVE MEDIA MONITORING BY ADJUSTING FOR CO-VIEWING

RELATED APPLICATION

This patent claims the benefit of the filing date of U.S. Provisional Patent Application No. 62/445,216 filed on Jan. 11, 2017 and which is incorporated by reference herein in its entirety.

FIELD OF THE DISCLOSURE

This disclosure relates generally to monitoring media, and, more particularly, to methods and apparatus to improve media monitoring by adjusting for co-viewing.

BACKGROUND

In recent years, methods of accessing media have evolved. For example, in the past, media was primarily accessed via televisions coupled to set-top boxes. Recently, media services deployed via computer systems such as desktop, laptop, and handheld mobile devices (e.g., smartphones, tablets, etc.) have been introduced that allow users to request and present the media on the computer systems. Such computer systems as well as other media presentation platforms enable consumption of the media by one or more people (e.g., a group of viewers watching a screen).

BRIEF DESCRIPTION OF THE DRAWINGS

FIG. 5 depicts a first example table and a second example table illustrating panelist impression and exposure minute information corresponding to a plurality of primary demographics, secondary demographics, and media genres.

FIG. 6 depicts a third example table and a fourth example table illustrating panelist impression and exposure minute information corresponding to a plurality of primary demographics and secondary demographics for a media genre.

FIG. 9 depicts the seventh example table and the eighth example table of FIG. 8 and a ninth example table illustrating an aggregation of census co-viewing impressions and census exposure times.

Wherever possible, the same reference numbers will be used throughout the drawing(s) and accompanying written description to refer to the same or like parts.

DETAILED DESCRIPTION

Figure 1:
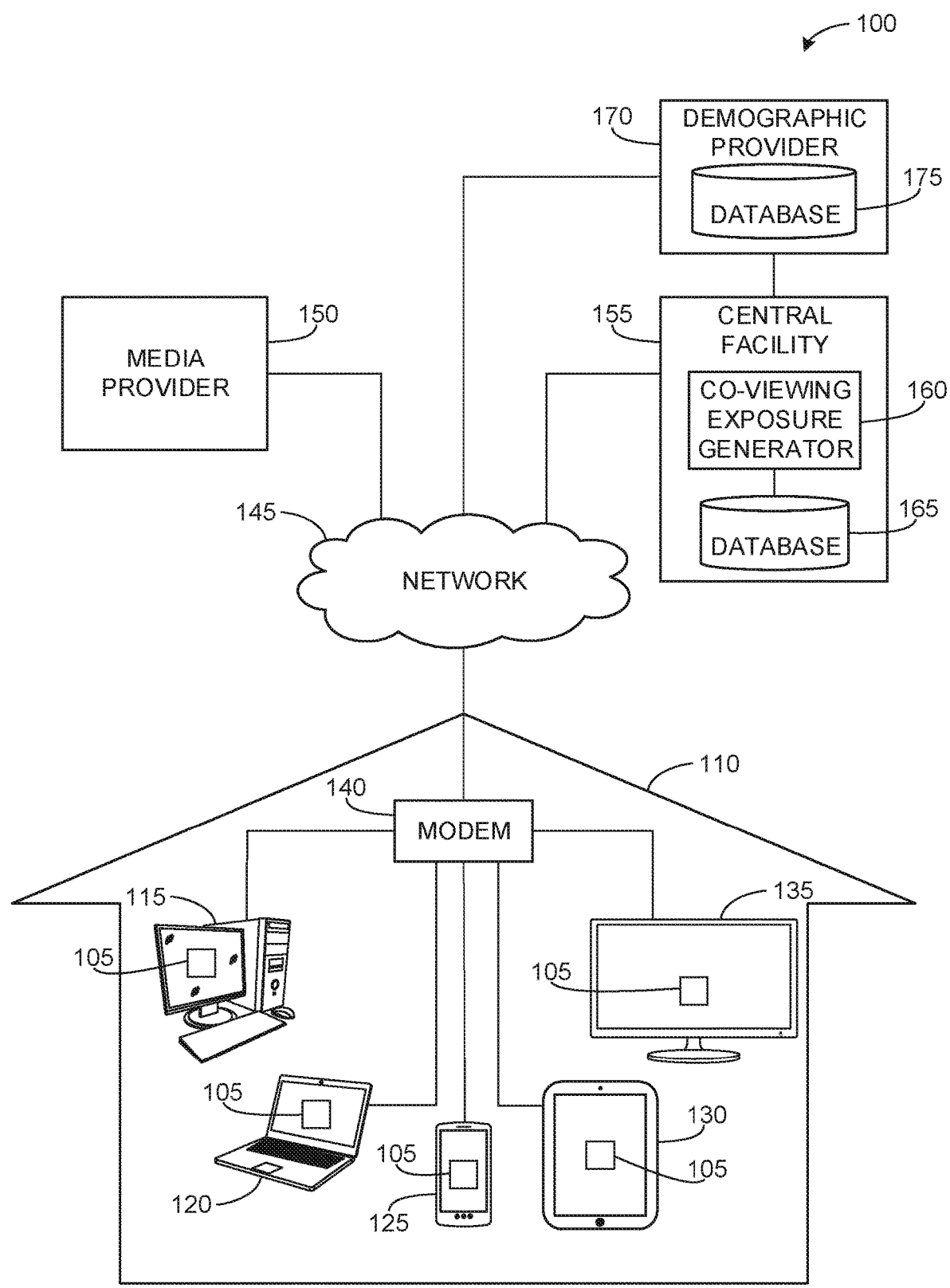
FIG. 1 is a block diagram of an example environment in which an example co-viewing exposure generator improves media monitoring by adjusting for co-viewing.

Audience measurement entities (AME) desire to gain knowledge on users viewing different types of media. As used herein, the term "media" includes any type of content and/or advertisement delivered via any type of distribution medium. Thus, media includes television programming or advertisements, radio programming or advertisements, movies, web sites, streaming media, etc. In examples disclosed herein, monitoring information (e.g., media monitoring information) includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

In particular, the AME want to monitor media consumption by users on media devices such as, for example, Internet-enabled televisions, personal computers (e.g., desktop computers, laptop computers, etc.), Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc. The AME wants to, among other things, monitor exposure to advertisements, determine advertisement effectiveness, determine user behavior, identify purchasing behavior associated with various demographics, etc. Some known systems have utilized a meter to monitor media being transmitted to and/or from the monitored media device.

The AME utilize methods and apparatus to monitor media consumption behavior of users within a designated market area (e.g., a geographic area, a television media market, etc.) and determine one or more demographics of the users. In some disclosed examples, the AME monitors impressions of advertisements, endorsements, or other messages delivered via media, which the AME may use to generate impression statistics (e.g., a number of users corresponding to one or more demographics exposed to the media). For example, the AME may monitor a video presented on a webpage accessible by a desktop computer. The AME may determine a number of users within a gender demographic of male and an age demographic of 35 years or older that were exposed to the video.

In some disclosed examples, the AME utilizes a meter (e.g., a people meter, a media meter, a streaming media meter, a network monitoring meter, etc.) to obtain media monitoring information (e.g., impression statistics, media consumption duration, etc.) for one or more designated market areas (DMAs) of interest. For example, the AME may obtain a number of impressions from users. For example, a user may be a consumer, a subscriber, etc., of media. For example, a user may be a person in the presence of the media during a presentation, a viewing, etc., of the media. The AME may process the number of impressions based on one or more demographics corresponding to the users. As a result, the AME may map the number of impressions by the users to the associated demographics of the users. The AME may utilize the meter to obtain detailed media consumption behavior of a panelist such as, for example, a media genre type, a television show description, an episode number of the television show, a season number of the television show, use of trick modes (e.g., pause, fast forward, rewind, sharing, space shift, time shift, etc.), etc.

As used herein, the term "panelists" refers to users registered on panels maintained by a ratings entity (e.g., an audience measurement company, an AME, etc.) that owns and/or operates the ratings entity subsystem. The AME may also utilize the meter to obtain detailed media consumption behavior of the panelist regarding a media session (e.g., a time period during which the panelist is exposed to media) such as, for example, an amount of time (e.g., a second, a minute, a quarter-hour, etc.) that the panelist is exposed to the media, how many media intervals (e.g., the media may be broken up into individual sections, where each section is tagged with metadata), were consumed, etc.

In some disclosed examples, the AME also obtains media monitoring information from a census information provider. The census information provider may provide demographic information regarding users of a service provided by the census information provider (e.g., census viewers). The census information provider may provide census viewer impressions, census viewer exposure data (e.g., census viewer exposure time), etc. For example, the census information provider may determine an amount of exposure time for one or more census viewers being exposed to media. For example, the census information provider may determine a number of minutes a census viewer was exposed to a YOUTUBE™ video. In some examples, the AME obtains media monitoring information corresponding to census viewers without the assistance of the census information provider. For example, the AME may use methods and apparatus to obtain the media monitoring information corresponding to the census viewers without querying the census information provider.

An example census information provider is a demographic provider (e.g., FACEBOOK™). As used herein, the term "demographic provider" refers to an entity that generates, updates, and/or manages databases (e.g., substantially large databases) of demographic information, where the demographic information may be obtained by accessing public databases, collecting information from users, etc. The demographic provider may obtain a number of impressions, an amount of exposure time, etc., from users of a service provided by the demographic provider (e.g., census viewers). The demographic provider may process the number of impressions based on one or more demographics corresponding to the users. As a result, the demographic provider may map the number of impressions by the users to the associated demographics of the users. The demographic provider may transmit the number of impressions and the corresponding demographics to the AME.

A demographic provider may be unable to determine that multiple people are present when the demographic provider detects an impression. For example, a first census viewer and a second census viewer are watching a video on YouTube™. The demographic provider may obtain an impression of the video because the first census viewer is logged into a YouTube™ account, a Facebook™ account, etc., associated with the first census viewer. As a result, the demographic provider may associate the impression with the demographics of the first census viewer, instead of associating the impression with the demographics of the first census viewer and the second census viewer. In some examples, not associating the impression with the demographics of the second census viewer leads to inaccurate audience measurements due to underreported impressions of co-viewing census viewers.

In some disclosed examples, the demographic provider may process the exposure time based on one or more demographics corresponding to the users. As a result, the demographic provider may map the exposure time of the users to the associated demographics of the users. The demographic provider may transmit the exposure time and/ or the corresponding demographics to the AME. However, the exposure time transmitted by the demographic provider may not take into consideration that the exposure time may correspond to more than one user. For example, a first census viewer and a second census viewer are watching a video on YouTube™. The demographic provider may obtain an amount of exposure time of the video because the first census viewer is logged into a YouTube™ account associated with the first census viewer. As a result, the demographic provider may associate the exposure time with the demographics of the first census viewer, instead of associating the exposure time with the demographics of the first census viewer and the second census viewer. In some examples, not associating the exposure time with the demographics of the second census viewer leads to inaccurate audience measurements due to underreported exposure times of co-viewing census viewers.

In some disclosed examples, the AME obtains the number of impressions and/or the corresponding demographics from the demographic provider (also known as a data enrichment provider) or another source of demographic information about media exposures. However, the AME may perform a correction to the obtained information. For example, Digital TV Ratings (dTVR) and Digital Advertising Ratings (DAR) may apply methodologies to correct census data for misattribution (i.e., sharing media devices) and data enrichment provider (DEP) Non-Coverage based on what is seen in the Cross Platform Homes (CPH) panel. However, it is also seen in the panel that multiple household members view media at the same time. Although there are multiple people viewing simultaneously, the DEP cookie or other demographic provider may associate the view with only one viewer. To provide more accurate measurements of what is occurring in media exposure environments (e.g., households where media devices are present), a co-viewing methodology may be applied.

Some panels may recognize the presence of more than one media viewer. For example, in the graphical interface identified as the Netsight meter prompt illustrated in FIG. 10, the panelist may be prompted to identify if multiple people are present. As used herein, a person (e.g., a listener, a panelist, a viewer, etc.) being exposed to and/or presented with media (e.g., audio-based media, visual-based media, audio and visual-based media, etc.) with one or more other persons is referred to as a co-media consumer (e.g., a co-panelist, a co-listener, a co-viewer, etc.). For example, a viewer being presented with visual-based media (e.g., a streaming video with corresponding audio) with another viewer is referred to as a co-viewer. In another example, a person being exposed to audio-based media (e.g., streaming music, a radio broadcast, etc.) with another person is referred to as a co-listener. Throughout this disclosure, references made to viewing and viewers apply equally to listening and listeners or any other way of consuming, experiencing, etc., media (e.g., reference to co-viewers and viewers may alternatively be replaced with co-listeners and listeners).

In some disclosed examples, the AME measures the percentage of viewers of a particular demographic (e.g., demographic X, demographic of X and Y, etc.) simultaneously exposed to media (e.g., watching a video on a desktop computer screen, a television screen, a display of a media device, etc.) with viewers of a demographic Y for all demographic pairs, where X and Y may be the same or different. In some disclosed examples, such percentages are utilized to generate a matrix or any other data structure, which is referred to herein as a "co-viewing factor." In some disclosed examples, the co-viewing factor is applied prior to other audience measurement calibration techniques to account for non-coverage and/or misattribution. In some disclosed examples, the co-viewing factor is applied after other audience measurement calibration techniques to account for non-coverage and/or misattribution. For example, the co-viewing factor may be applied on total census data (e.g., information provided by a demographic provider) by demographic bucket via a dot product calculation after other audience measurement calibration techniques have been completed. The co-viewing factor may be used to adjust the census data to provide a more accurate measurement. The co-viewing factor may be calculated based on panelist data associated with accessed and/or exposed media on media devices (e.g., desktop computer, hand-held mobile device, tablet computer, television, etc.).

In some disclosed examples, the AME calculates an aggregate impression total (e.g., an aggregate viewer impression total). The AME may calculate the aggregate impression total based on a number of census viewer impressions and a number of census co-viewer impressions. For example, the AME may obtain census impression information (e.g., a number of impressions for media, demographics of a user exposed to the media for a number of impressions, etc.) from the demographic provider. The AME may determine the number of census viewer impressions for a demographic of interest based on the obtained census impression information. The AME may determine the number of census co-viewer impressions by performing a matrix multiplication operation such as a dot product calculation on the number of census viewer impressions and a corresponding co-viewing factor. The AME may calculate a sum of the number of census viewer impressions and the number of census co-viewer impressions to determine the aggregate impression total.

As used herein, the term "co-viewer impression" refers to an impression credited to a first viewer in a first demographic when exposed to media related to a media genre when accompanying a second panelist in a second demographic. As used herein, the terms "co-viewer exposure time," "co-viewer exposure duration," and "co-viewer exposure minutes" are used interchangeably and refer to an amount of time credited to the first viewer in the first demographic when exposed to media related to the media genre when accompanying the second viewer in the second demographic. In some examples, the first and the second demographic are the same. Alternatively, the first and the second demographic may be different.

In some disclosed examples, the AME calculates an aggregate exposure time total (e.g., an aggregate viewer exposure time total) for a demographic of interest based on census viewer exposure time and census co-viewer exposure time. For example, the AME may obtain census exposure information (e.g., a number of exposure minutes for media, demographics of a user exposed to the media for a number of exposure minutes, etc.) from the demographic provider. The AME may determine the exposure time of media for the demographic of interest based on the obtained census exposure information. The AME may determine the census co-viewer exposure time by performing a matrix multiplication operation such as a dot product calculation on the census viewer exposure time for the demographic of interest and a corresponding co-viewing factor. The AME may determine a sum of the census viewer exposure time and the census co-viewer exposure time to determine the aggregate exposure time total for the demographic of interest.

In some disclosed examples, calculating a co-viewing factor based on panelist data (e.g., meter obtained data) produces the co-viewing factor more accurately aligned with actual co-viewing media consumption behavior of a population. For example, by calculating a co-viewing factor based on a manually operated survey of a population (e.g., a collection of panelists), the manually operated survey may produce data based on misaligned or skewed data due to human error (e.g., erroneous recollection of media consumption behavior). The co-viewing factor calculated based on the survey may be inaccurately aligned with the actual co-viewing media consumption behavior of the population. Examples disclosed herein can be implemented by a co-viewing exposure generator executed, managed, operated, etc., by the AME.

FIG. 1 is a block diagram of an example environment 100 constructed in accordance with the teachings of this disclosure to monitor media. The example environment 100 includes an example meter 105 operating in an example media exposure measurement location 110. The example media exposure measurement location 110 of the illustrated example includes example media devices 115, 120, 125, 130, 135, and an example modem 140. Further shown are an example network 145, an example media provider 150, an example central facility 155 including an example co-viewing exposure generator 160, an example database 165, and an example demographic provider 170 including another example database 175.

In the illustrated example of FIG. 1, the meter 105 is a software-based meter operating on, executed by, etc., the media devices 115, 120, 125, 130, 135. For example, the meter 105 may be an application executed by machine readable instructions on the media device 115. In such an example, the meter 105 may display a graphical user interface (GUI) where a panelist may identify which panelists (e.g., a primary panelist, a co-viewer, etc.) are exposed to presented media. For example, the meter 105 may be a network monitoring media meter operating on the media device 115 (e.g., the desktop computer 115). Additionally or alternatively, the example meter 105 may be a standalone metering device (e.g., a people meter, a media meter, a streaming media meter, etc., and/or any other type of meter).

The meter 105 of the illustrated example determines aspects of audience configuration (e.g., which household member(s) are currently watching a specified portion of media, the corresponding demographics of that household member, an exposure time for the specified portion of the media, etc.). In some examples, the meter 105 captures a number of exposure minutes, a number of impressions, and/or demographics of a panelist corresponding to the number of exposure minutes and/or the number of impressions. The example meter 105 may capture information about the household audience by prompting the audience member(s) via the GUI on the media devices 115, 120, 125, 130, 135 to indicate that they are present during media presentation by, for example, selecting their assigned identifier on the GUI of the meter 105. When a member of the household selects their corresponding identifier, the example meter 105 identifies which household member is present, and associates demographic information associated with the household member, such as a name, a gender, an age, an income category, etc. with the media presentation. In some examples, a guest accompanying the member of the household generates a guest identifier including demographics corresponding to the guest via the GUI of the meter 105.

The media exposure measurement location 110 of the illustrated example of FIG. 1 is a panelist household. However, the example media exposure measurement location 110 may be any other location, such as, for example an Internet café, an office, an airport, a library, a non-panelist household, etc. While, in the illustrated example, a single media exposure measurement location 110 is shown, any number and/or type(s) of media exposure measurement locations may be used.

The panelist household may include one or more panelists. The panelists are users registered on panels maintained by a ratings entity (e.g., an audience measurement company) that owns and/or operates the ratings entity subsystem. Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets.

People (e.g., households, organizations, etc.) register as panelists via, for example, a user interface presented on a media device (e.g., via a website). People may be recruited as panelists in additional or alternative manners such as, for example, via a telephone interview, by completing an online survey, etc. Additionally or alternatively, people may be contacted and/or enlisted to join a panel using any desired methodology (e.g., random selection, statistical selection, phone solicitations, Internet advertisements, surveys, advertisements in shopping malls, product packaging, etc.).

In the illustrated example, the media exposure measurement location 110 includes the media devices 115, 120, 125, 130, 135. The example media devices 115, 120, 125, 130, 135 of the illustrated example shown in FIG. 1 are devices that retrieve media from the media provider 150 for presentation. In some examples, the media devices 115, 120, 125, 130, 135 are capable of directly presenting media (e.g., via a display) while, in other examples, the media devices 115, 120, 125, 130, 135 present the media on separate media presentation equipment (e.g., speakers, a display, etc.). Thus, as used herein "media devices" may or may not be able to present media without assistance from a second device.

Media devices are typically consumer electronic devices. For example, the media device 120 of the illustrated example is a personal computer such as a laptop computer, and thus, is capable of directly presenting media (e.g., via an integrated and/or connected display and speakers). In another example, the media devices 125, 130, 135 are an Internet-enabled mobile handset (e.g., a smartphone, an iPod®, etc.), a table computer (e.g., an iPad®, a MICROSOFT™ SURFACE™, etc.), and a smart television, respectively. While in the illustrated example, the media devices 115, 120, 125, 130, 135 are shown, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 4, etc.), tablet computers (e.g., an iPad®, a Microsoft Surface, etc.), digital media players (e.g., a Roku® media player, a Slingbox®, a Tivo®, etc.), smart televisions, desktop computers, laptop computers, servers, etc. may additionally or alternatively be used.

In the illustrated example of FIG. 1, the meter 105 transmits media monitoring information obtained from the media devices 115, 120, 125, 130, 135 to the central facility 155 via the network 145. For example, the meter 105 may transmit an impression, an exposure time, etc., for one or more panelists, co-panelists, etc., to the central facility 155. In some examples, the meter 105 transmits the media monitoring information as the media monitoring information is obtained. In some instances, the meter 105 transmits the media monitoring information after a time period. For example, the meter 105 may transmit the media monitoring information every 100 milliseconds, every hour, every day, etc. The example meter 105 may generate a log of the media monitoring information and transmit the log to the central facility 155 in lieu of the media monitoring information.

In some examples, the meter 105 processes the obtained media monitoring information corresponding to media prior to transmitting the media monitoring information to the central facility 155. For example, the meter 105 may credit the example media devices 115, 120, 125, 130, 135 as having presented the media. For example, the meter 105 may credit the media device 115 as having presented the media. In some examples, the meter 105 credits media identification information to the media devices 115, 120, 125, 130, 135. For example, the meter 105 may credit the media device 115 with presenting a YouTube™ video, with presenting the YouTube™ video for a duration corresponding to an exposure time, etc.

The modem 140 of the illustrated example of FIG. 1 is an electronic communications device that enables network communications of the media exposure measurement location 110 to reach the network 145. Alternatively, the example modem 140 may enable point-to-point communications with the example central facility 155 and/or the example demographic provider 170. In some examples, the modem 140 is a digital subscriber line (DSL) modem, while in some other examples the modem 140 is a cable modem. In some examples, the modem 140 is a media converter that converts one communications medium (e.g., electrical communications, optical communications, wireless communications, etc.) into another type of communications medium.

In the illustrated example of FIG. 1, the meter 105 sends obtained and/or processed media monitoring information to the central facility 155 for analysis via the network 145. For example, the meter 105 may send a number of exposure minutes, a number of impressions, and/or demographics of a panelist corresponding to the number of exposure minutes and/or the number of impressions. The network 145 of the illustrated example of FIG. 1 is the Internet. However, the example network 145 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 145 enables the example meter 105 to be in communication with the example central facility 155. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time messages.

The media provider 150 of the illustrated example of FIG. 1 is a server providing Internet media (e.g., web pages, audio, videos, images, etc.). The media provider 150 may be implemented by any provider(s) of media such as a digital broadcast provider (cable television service, fiber-optic television service, etc.) and/or an on-demand digital media provider (e.g., Internet streaming video and/or audio services such as Netflix®, YouTube®, Hulu®, Pandora®, Last.fm®,) and/or any other provider of streaming media services. In some other examples, the media provider 150 is a host for web site(s). Additionally or alternatively, the media provider(s) 150 may not be on the Internet. For example, the media provider may be on a private and/or semi-private network (e.g., a LAN, a virtual private network) to which the media device(s) 115, 120, 125, 130, 135 connect.

In the illustrated example, the central facility 155 includes the co-viewing exposure generator 160 to obtain and process media monitoring information from the meter 105 to generate exposure metrics related to presented media. For example, the co-viewing exposure generator 160 may obtain a number of exposure minutes, a number of impressions, and/or demographics of a panelist corresponding to the number of exposure minutes and/or the number of impressions. The co-viewing exposure generator 160 of the illustrated example is a server. Alternatively, the example co-viewing exposure generator 160 may be a collection of servers. The example co-viewing exposure generator 160 analyzes the media monitoring information to identify, for example, a primary panelist exposed to the media, a secondary panelist exposed to the media, a category and/or a genre of the media, and/or any other media statistics or aggregate information that may be determined from the media monitoring information. The media monitoring information may also be correlated or processed with factors such as geodemographic data (e.g., a geographic location of the media exposure measurement location, age(s) of the panelist(s) associated with the media exposure measurement location, an income level of a panelist, etc.). Media monitoring information may be useful to manufacturers and/or advertisers to identify geodemographic trends with respect to media devices, identify market opportunities, and/or otherwise evaluate their own and/or their competitors' products.

In the illustrated example, the co-viewing exposure generator 160 includes an interface to transmit and/or receive Internet messages (e.g., a HyperText Transfer Protocol (HTTP) request(s)) that include the media monitoring information. Additionally or alternatively, any other method(s) to receive media monitoring information may be used such as, for example, an HTTP Secure protocol (HTTPS), a file transfer protocol (FTP), a secure file transfer protocol (SFTP), etc. In the illustrated example, the co-viewing exposure generator 160 obtains information (e.g., demographic information of a user, impression statistics of media, etc.) from the demographic provider 170 via the network 145. Additionally or alternatively, the example co-viewing exposure generator 160 may obtain the information directly from the demographic provider 170.

In the illustrated example of FIG. 1, the central facility 155 includes the database 165 to record data (e.g., obtained media monitoring information, impression statistics, etc.). The database 165 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 165 may additionally or alternatively be implemented by one or more double data rate (DDR) memories, such as DDR, DDR2, DDR3, mobile DDR (mDDR), etc. The database 165 may additionally or alternatively be implemented by one or more mass storage devices such as hard disk drive(s), compact disk drive(s) digital versatile disk drive(s), etc. While in the illustrated example the database 165 is illustrated as a single database, the database 165 may be implemented by any number and/or type(s) of databases. Furthermore, the data stored in the database 165 may be in any data format such as, for example, binary data, comma delimited data, tab delimited data, structured query language (SQL) structures, etc.

In the illustrated example of FIG. 1, the media devices 115, 120, 125, 130, 135 sends media monitoring information to the demographic provider 170 via the network 145. In some examples, the media devices 115, 120, 125, 130, 135 send the media monitoring information to the demographic provider 170 based on an instruction executed by an application operating on at least one of the media devices 115, 120, 125, 130, 135. The demographic provider 170 of the illustrated example is a server that obtains and processes media monitoring information from the media devices 115, 120, 125, 130, 135 to generate exposure metrics related to presented media.

In the illustrated example, the demographic provider 170 analyzes the media monitoring information to identify, for example, a primary panelist exposed to the media, a category and/or a genre of the media, and/or any other media statistics or aggregate information that may be determined from the media monitoring information. The media monitoring information may also be correlated or processed with factors such as geodemographic data (e.g., a geographic location of the media exposure measurement location, age(s) of the panelist(s) associated with the media exposure measurement location, an income level of a panelist, etc.). Media monitoring information may be useful to manufacturers and/or advertisers to identify geodemographic trends with respect to media devices, identify market opportunities, and/or otherwise evaluate their own and/or their competitors' products.

In the illustrated example, the demographic provider 170 includes an interface to transmit and/or receive Internet messages (e.g., a HyperText Transfer Protocol (HTTP) request(s)) that include the media monitoring information. Additionally or alternatively, any other method(s) to receive metering information may be used such as, for example, an HTTP Secure protocol (HTTPS), a file transfer protocol (FTP), a secure file transfer protocol (SFTP), etc. In the illustrated example, the demographic provider 170 may obtain a request for information (e.g., demographic information of a user, impression statistics of media, exposure information, etc.) from the co-viewing exposure generator 160. In response to receiving the request for the information, the demographic provider 170 may transmit the information to the co-viewing exposure generator 160.

In the illustrated example of FIG. 1, the demographic provider 170 includes the database 175 to record data (e.g., obtained media monitoring information, impression statistics, etc.). The database 175 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 175 may additionally or alternatively be implemented by one or more double data rate (DDR) memories, such as DDR, DDR2, DDR3, mobile DDR (mDDR), etc. The database 175 may additionally or alternatively be implemented by one or more mass storage devices such as hard disk drive(s), compact disk drive(s) digital versatile disk drive(s), etc. While in the illustrated example the database 175 is illustrated as a single database, the database 175 may be implemented by any number and/or type(s) of databases. Furthermore, the data stored in the database 175 may be in any data format such as, for example, binary data, comma delimited data, tab delimited data, structured query language (SQL) structures, etc.

Figure 2:
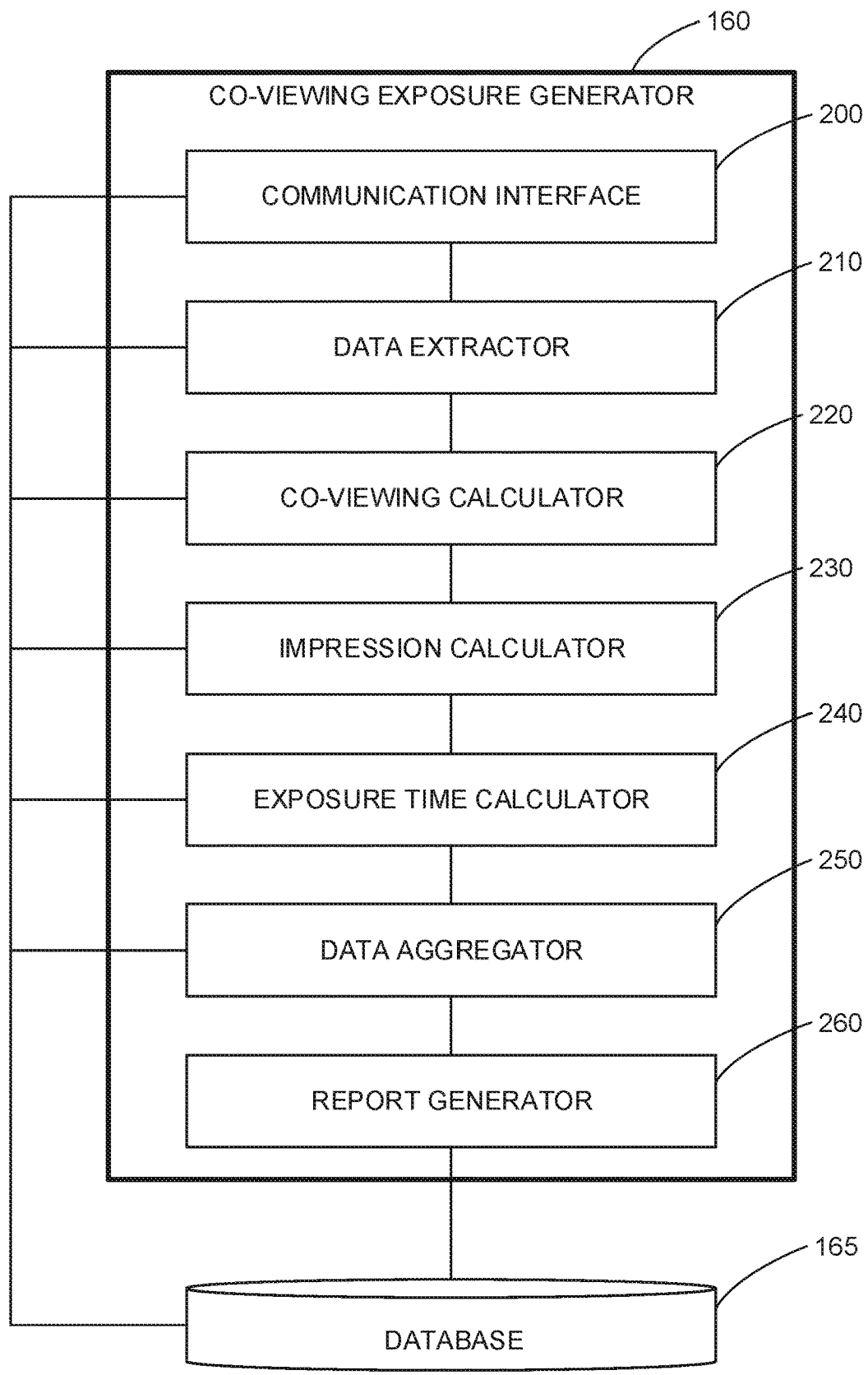
FIG. 2 is a block diagram of an example implementation of the co-viewing exposure generator of FIG. 1 to implement the examples disclosed herein.

FIG. 2 is a block diagram of an example implementation of the example co-viewing exposure generator 160 of FIG. 1. The example co-viewing exposure generator 160 obtains and processes media monitoring information from the meter 105 and/or the demographic provider 170 of FIG. 1 to generate exposure metrics related to presented media to be used by an AME for measuring and/or reporting operations. In the illustrated example, the co-viewing exposure generator 160 includes an example communication interface 200, an example data extractor 210, an example co-viewing calculator 220, an example impression calculator 230, an exposure time calculator 240, an example data aggregator 250, and an example report generator 260.

In the illustrated example of FIG. 2, the co-viewing exposure generator 160 includes the communication interface 200 to transmit and/or receive Internet messages (e.g., a HyperText Transfer Protocol (HTTP) request(s)) that include the media monitoring information. Additionally or alternatively, any other method(s) to receive and/or transmit media monitoring information may be used such as, for example, an HTTP Secure protocol (HTTPS), a file transfer protocol (FTP), a secure file transfer protocol (SFTP), etc. In some examples, the communication interface 200 transmits a request for information (e.g., demographic information of a user, impression statistics of media, etc.) to the demographic provider 170 of FIG. 1. In such examples or other examples, the communication interface 200 obtains the request for the information from the demographic provider 170. In some examples, the communication interface 200 stores the obtained media monitoring information in the database 165.

In the illustrated example of FIG. 2, the co-viewing exposure generator 160 includes the data extractor 210 to process media monitoring information by categorizing, filtering, sorting, etc., the media monitoring information. In some examples, the data extractor 210 generates a table based on the processed media monitoring information. In some examples, the data extractor 210 determines a number of impressions based on the media monitoring information. For example, the data extractor 210 may determine a number of census impressions, a number of panelist viewer impressions, a number of panelist co-viewer impressions, etc., corresponding to a demographic that includes females age 2-5, media related to a children's media genre, etc., and/or a combination thereof based on the media monitoring information.

In some examples, the data extractor 210 determines exposure time for a panelist based on the media monitoring information. For example, the data extractor 210 may determine exposure times for census viewers, panelist viewers, panelist co-viewers, etc., corresponding to a demographic including males age 65 and older, media related to a comedy media genre, etc., and/or a combination thereof based on the media monitoring information. In some examples, the data extractor 210 retrieves information (e.g., media monitoring information) from the database 165. In some examples, the data extractor 210 stores information (e.g., a number of impressions, a number of exposure minutes, a table, etc.) in the database 165.

In the illustrated example of FIG. 2, the co-viewing exposure generator 160 includes the co-viewing calculator 220 to calculate a co-viewing factor based on the media monitoring information (e.g., the obtained media monitoring information, the processed media monitoring information, etc.). In some examples, the co-viewing calculator 220 calculates a co-viewing factor (e.g., a percentage, a scaling factor, etc.) based on impressions. For example, the co-viewing calculator 220 may calculate a co-viewing percentage based on a number of co-viewer impressions with respect to a number of total impressions. In some examples, the co-viewing calculator 220 calculates a co-viewing factor based on exposure time. For example, the co-viewing calculator 220 may calculate a co-viewing percentage based on a number of co-viewer exposure minutes with respect to a number of total exposure minutes. In some examples, the co-viewing calculator 220 retrieves information (e.g., a number of impressions, a number of exposure minutes, etc.) from the database 165. In some examples, the co-viewing calculator 220 stores information (e.g., a co-viewing factor) in the database 165.

In the illustrated example of FIG. 2, the co-viewing exposure generator 160 includes the impression calculator 230 to calculate or determine a number of co-viewer impressions based on a co-viewing factor. In some examples, the impression calculator 230 determines a number of panelist co-viewer impressions by performing a matrix multiplication operation such as a dot product calculation on a number of total impressions and a corresponding co-viewing factor. For example, the impression calculator 230 may determine a number of panelist co-viewer impressions credited to panelists in a first demographic including females age 2-34 for media related to a children's media genre by performing a dot product calculation on (1) a total number of impressions credited to panelists in the first demographic for exposure to media related to the children's media genre and (2) a co-viewing factor corresponding to panelists in a second demographic accompanying panelists in the first demographic for exposure to the media related to the children's media genre. In some examples, the impression calculator 230 retrieves information (e.g., a number of impressions, a co-viewing factor, etc.) from the database 165. In some examples, the impression calculator 230 stores information (e.g., panelist co-viewer impressions) in the database 165.

In the illustrated example of FIG. 2, the co-viewing exposure generator 160 includes exposure time calculator 240 to calculate or determine a number of co-viewer exposure minutes based on a co-viewing factor. In some examples, the exposure time calculator 240 determines a number of panelist co-viewer exposure minutes by performing a matrix multiplication operation such as a dot product calculation on a number of total exposure minutes and a corresponding co-viewing factor. For example, the exposure time calculator 240 may determine a number of panelist co-viewer exposure minutes for a third demographic including males age 65 and older for media related to a comedy media genre by performing a dot product calculation on (1) a total number of exposure minutes credited to panelists in the third demographic for exposure to media related to the comedy media genre and (2) a co-viewing factor corresponding to panelists in a fourth demographic accompanying panelists in the third demographic for exposure to the media related to the comedy media genre. In some examples, the exposure time calculator 240 retrieves information (e.g., a number of exposure minutes, a co-viewing factor, etc.) from the database 165. In some examples, the exposure time calculator 240 stores information (e.g., panelist co-viewer exposure minutes) in the database 165.

In the illustrated example of FIG. 2, the co-viewing exposure generator 160 includes the data aggregator 250 to determine an adjusted number of total impressions (e.g., an aggregate impression total), an adjusted number of total exposure minutes (e.g., an aggregate exposure time total), etc. In some examples, the data aggregator 250 calculates an adjusted number of total impressions based on a sum of the total impressions obtained from the demographic provider 170 of FIG. 1 and calculated panelist co-viewer impressions. In some examples, the data aggregator 250 calculates an adjusted number of total exposure minutes based on a sum of the total exposure minutes obtained from the demographic provider 170 and the calculated panelist co-viewer exposure minutes.

For example, the data aggregator 250 may calculate an adjusted number of total exposure minutes credited to panelists in a first demographic including females age 2-34 exposed to media related to the children's media genre based on a sum of (1) the total number of exposure minutes obtained from the demographic provider 170 credited to panelists in the first demographic exposed to the media and (2) the calculated panelist co-viewer exposure minutes credited to panelists in a second demographic accompanying panelists in the first demographic exposed to the media. In some examples, the data aggregator 250 retrieves information (e.g., a total number of impressions, a number of panelist co-viewer impressions, etc.) from the database 165. In some examples, the data aggregator 250 stores information (e.g., an adjusted number of total impressions, an adjusted number of total exposure minutes, etc.) in the database 165.

In the illustrated example of FIG. 2, the co-viewing exposure generator 160 includes the report generator 260 to generate and/or prepare a report based on an adjusted number of total impressions, an adjusted number of total exposure minutes, etc. In some examples, the report generator 260 prepares media measurement reports indicative of the exposure of media on the media devices 115, 120, 125, 130, 135 of FIG. 1. In some examples, the report generator 260 generates a report identifying demographics associated with the media. For example, a primary panelist (e.g., a primary viewer) and a secondary panelist (e.g., a secondary viewer, a co-viewer, etc.) at the media exposure measurement location 110 of FIG. 1 may have provided the primary panelist's demographics and the secondary panelist's demographics to the AME. The example report generator 260 may generate a report associating the obtained panelist demographics with the exposed media.

For example, the report generator 260 may generate a report including a crediting of a presentation of a YouTube™ video to both a primary panelist of a first demographic (e.g., females age 2-34) and to a secondary panelist of a second demographic (e.g., males age 65 or older). In some examples, the report generator 260 retrieves information (e.g., an adjusted number of total impressions, an adjusted number of total exposure minutes, etc.) from the database 165. In some examples, the report generator 260 stores information (e.g., an adjusted impression report, an adjusted exposure minute report, etc.) in the database 165. In some examples, the report generator 260 transmits the report to reporting servers, census data aggregation servers, operation analyzers, etc., to improve an accuracy of media monitoring by adjusting for co-viewing.

While an example manner of implementing the co-viewing exposure generator 160 of FIG. 1 is illustrated in FIG. 2, one or more of the elements, processes and/or devices illustrated in FIG. 2 may be combined, divided, re-arranged, omitted, eliminated, and/or implemented in any other way. Further, the example communication interface 200, the example data extractor 210, the example co-viewing calculator 220, the example impression calculator 230, the example exposure time calculator 240, the example data aggregator 250, the example report generator 260 and/or, more generally, the example co-viewing exposure generator 160 of FIG. 2 may be implemented by hardware, software, firmware and/or any combination of hardware, software and/or firmware. Thus, for example, any of the example communication interface 200, the example data extractor 210, the example co-viewing calculator 220, the example impression calculator 230, the example exposure time calculator 240, the example data aggregator 250, the example report generator 260 and/or, more generally, the example central facility 155 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication interface 200, the example data extractor 210, the example co-viewing calculator 220, the example impression calculator 230, the example exposure time calculator 240, the example data aggregator 250, and/or the example report generator 260 is/are hereby expressly defined to include a non-transitory computer readable storage device or storage disk such as a memory, a digital versatile disk (DVD), a compact disk (CD), a Blu-ray disk, etc. including the software and/or firmware. Further still, the example co-viewing exposure generator 160 of FIG. 1 may include one or more elements, processes and/or devices in addition to, or instead of, those illustrated in FIG. 2, and/or may include more than one of any or all of the illustrated elements, processes, and devices.

Figure 3:
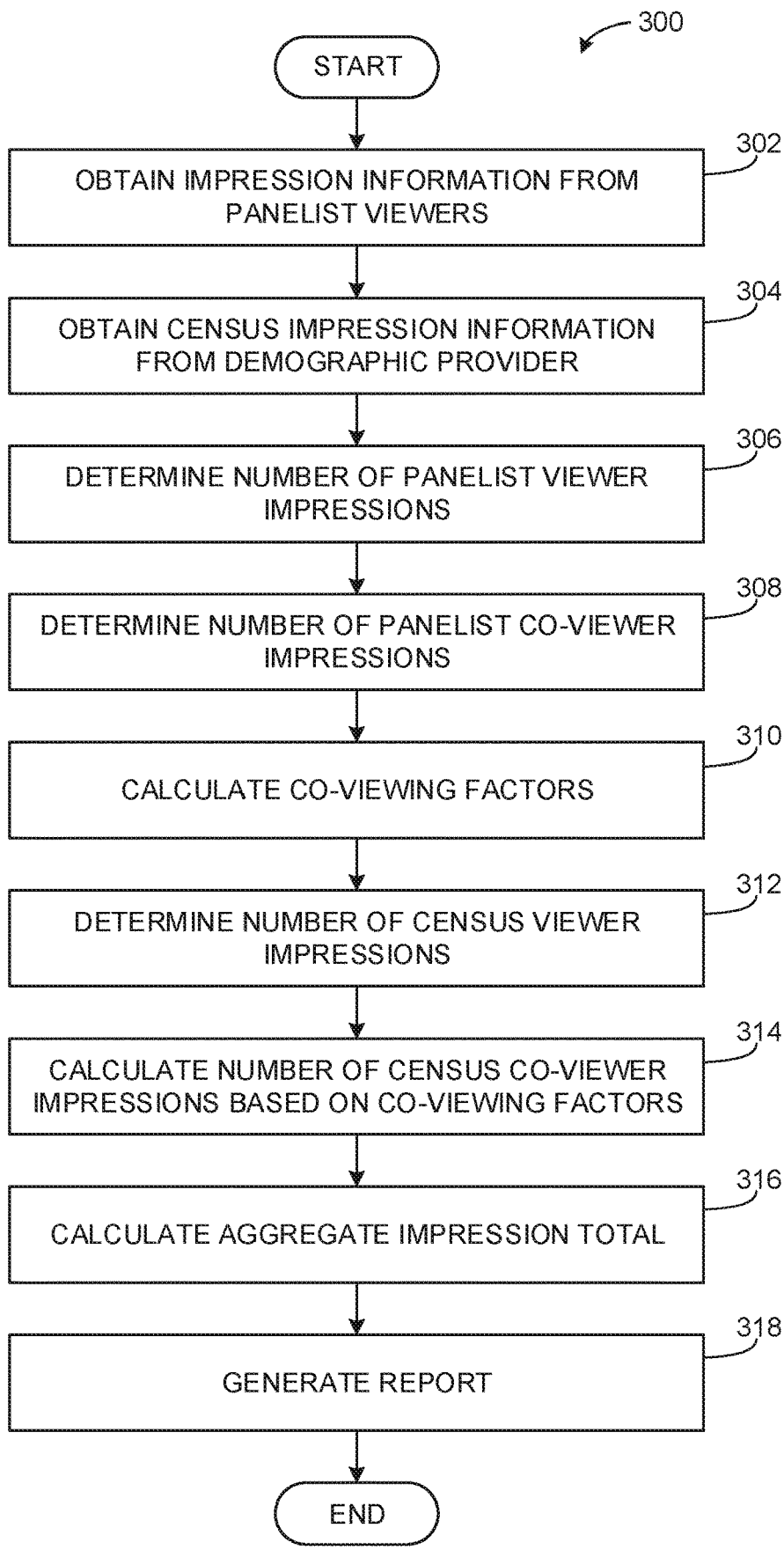
FIGS. 3-4 are flowcharts representative of example machine readable instructions that may be executed to implement the co-viewing exposure generator of FIG. 1 and/or FIG. 2.
Figure 4:
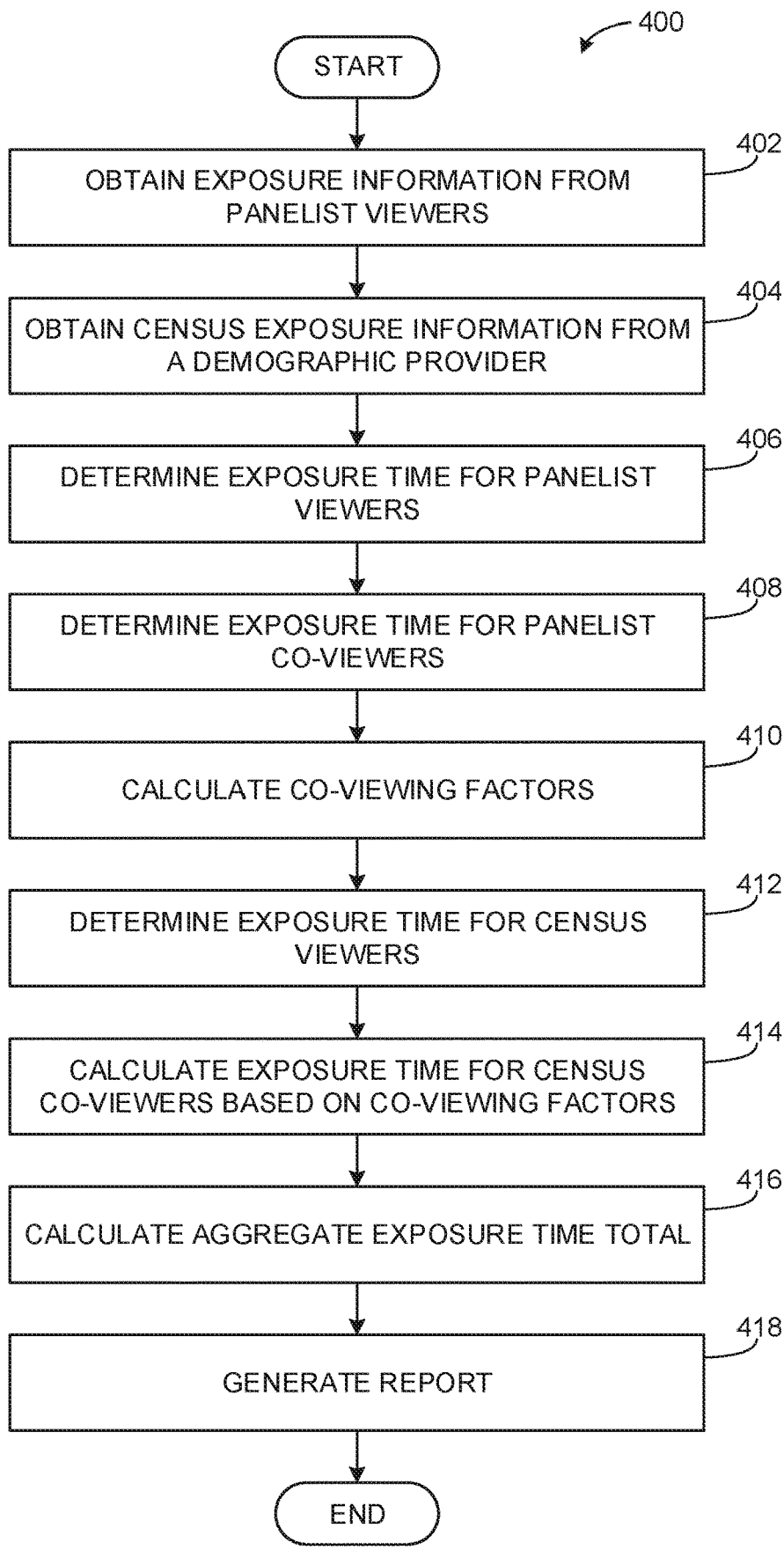

Flowcharts representative of example machine readable instructions for implementing the co-viewing exposure generator 160 of FIGS. 1-2 are shown in FIGS. 3-4. In these examples, the machine readable instructions comprise a program for execution by a processor such as a processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 3-4, many other methods of implementing the example co-viewing exposure generator 160 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 3-4 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

Figure 10:
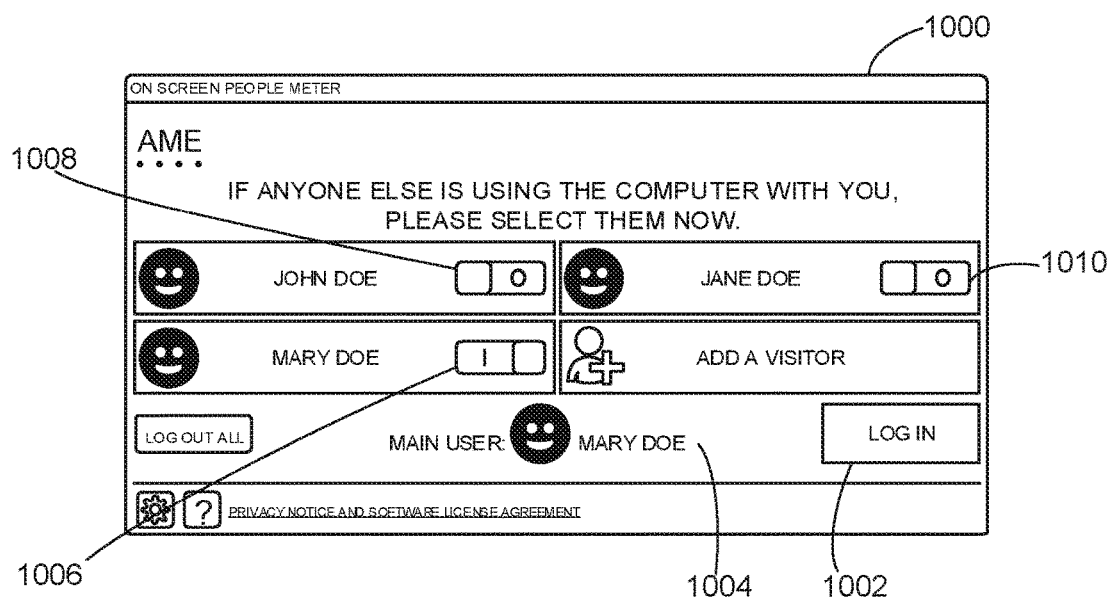
FIG. 10 is an example graphical user interface used to identify primary and secondary viewers of presented media.

FIG. 3 is a flowchart representative of example machine readable instructions which may be executed to implement the co-viewing exposure generator 160 of FIGS. 1-2 to calculate an aggregate impression total. The example program 300 of FIG. 3 begins at block 302 when the example co-viewing exposure generator 160 obtains impression information from panelist viewers. For example, the communication interface 200 may obtain media monitoring information including a number of impressions credited to panelists exposed to media related to a media genre from the meter 105 of FIG. 1. For example, a panelist may be prompted to identify if multiple people are present prior to presenting media. In such an example, a main user may select the main user and/or additional people that are present for exposure to the presented media as illustrated in FIG. 10. For example, in connection with the illustrated example of FIG. 10, the main user Mary Doe may identify Mary Doe as a primary viewer and/or John Doe and/or Jane Doe as secondary viewers or co-viewers of the presented media. As a result, logged impressions may be credited to the main user Mary Doe and/or one or more of the selected co-viewers.

At block 304, the example co-viewing exposure generator 160 obtains census impression information from a demographic provider. For example, the communication interface 200 may obtain media monitoring information including a number of census viewer impressions from the demographic provider 170 of FIG. 1.

At block 306, the example co-viewing exposure generator 160 determines a number of panelist viewer impressions. For example, the data extractor 210 may determine a number of impressions credited to primary viewers exposed to media, where the primary viewers belong to a first demographic or a first demographic group based on the obtained media monitoring information. For example, the data extractor 210 may categorize, filter, sort, etc., information in the obtained media monitoring information as illustrated in Table A 500 of FIG. 5. The example data extractor 210 categorizes impression information based on at least demographics of a primary viewer (PRIMARY DEMO) and a media genre (GENRE). In the illustrated example of Table A 500, the data extractor 210 determines a number of total impressions (TOTAL IMPs) corresponding to each of the primary viewer demographics and the media genres listed in the Table A 500. For example, as illustrated in Table A 500, the data extractor 210 determines that there are 100 total impressions credited to one or more primary viewers in a primary demographic of female age 2-5 exposed to media related to a children's media genre.

At block 308, the example co-viewing exposure generator 160 determines a number of panelist co-viewer impressions. For example, the data extractor 210 may determine a number of impressions credited to secondary viewers exposed to the media, where the secondary viewers belong to a second demographic group based on the obtained media monitoring information. In some examples, the second demographic group is different than the first demographic group. In other examples, the first and the second demographic group are the same. For example, the data extractor 210 may categorize, filter, sort, etc., information in the obtained media monitoring information as illustrated in Table B 500 of FIG. 5. The example data extractor 210 categorizes impression information based on at least a media genre (GENRE), demographics of a primary viewer (PRIMARY DEMO), and demographics of a secondary viewer (SECONDARY DEMO).

In the illustrated example of Table B 502, the data extractor 210 sorts the information based on (1) the GENRE, (2) the PRIMARY DEMO, and then (3) the SECONDARY DEMO. Alternatively, any other sorting order may be utilized. In the illustrated example of Table B 502, the data extractor 210 determines a number of total co-viewer impressions (CO-VIEWER IMPs) corresponding to a total number of impressions credited to one or more secondary viewers in a secondary demographic when accompanied by a primary viewer in a primary demographic when exposed to media related to a media genre. For example, as illustrated in Table B 502, the data extractor 210 determines that there are 11 impressions credited to one or more secondary viewers in the secondary demographic of female age 2-5 when accompanied by a primary viewer in the primary demographic of male age 65 and older when presented with media related to the children's media genre.

In some examples, the data extractor 210 filters media monitoring information (e.g., impression information) of interest. For example, as illustrated in Table C 600 of FIG. 6, the data extractor 210 aggregates a total number of impressions (TOTAL IMPs) for a media genre (GENRE) and a plurality of demographics of a primary viewer (PRIMARY DEMO). For example, as illustrated in Table C 600, the data extractor 210 determines that there are 200 total impressions credited to one or more primary viewers in the primary demographic of female (F) age 2-34 exposed to media categorized as belonging to a children's media genre. In some examples, the data extractor 210 processes the filtered impression information of interest. For example, as illustrated in Table D 602 of FIG. 6, the data extractor 210 determines a number of impressions by co-viewers (CO-VIEWER IMPs) in a secondary demographic when accompanied by a panelist in a primary demographic when presented media related to a media genre. For example, as illustrated in Table D 602, the data extractor 210 determines that there are 5 co-viewer impressions credited to one or more co-viewers in a secondary demographic of female age 35 and older when accompanied by a panelist in a primary demographic of female age 2-34 when exposed to media related to a children's media genre.

At block 310, the example co-viewing exposure generator 160 calculates co-viewing factors. For example, the co-viewing calculator 220 may calculate a percentage representative of a number of impressions credited to a primary viewer in a primary demographic that may also be credited to a secondary viewer in a secondary demographic. For example, as illustrated in Table E 700 of FIG. 7, the co-viewing calculator 220 calculates that 1.2% of impressions credited to a primary viewer in a primary demographic of male age 35 and older can also be credited to a secondary viewer in a secondary demographic of female age 2-34 when exposed to media related to a children's media genre.

Figure 7:
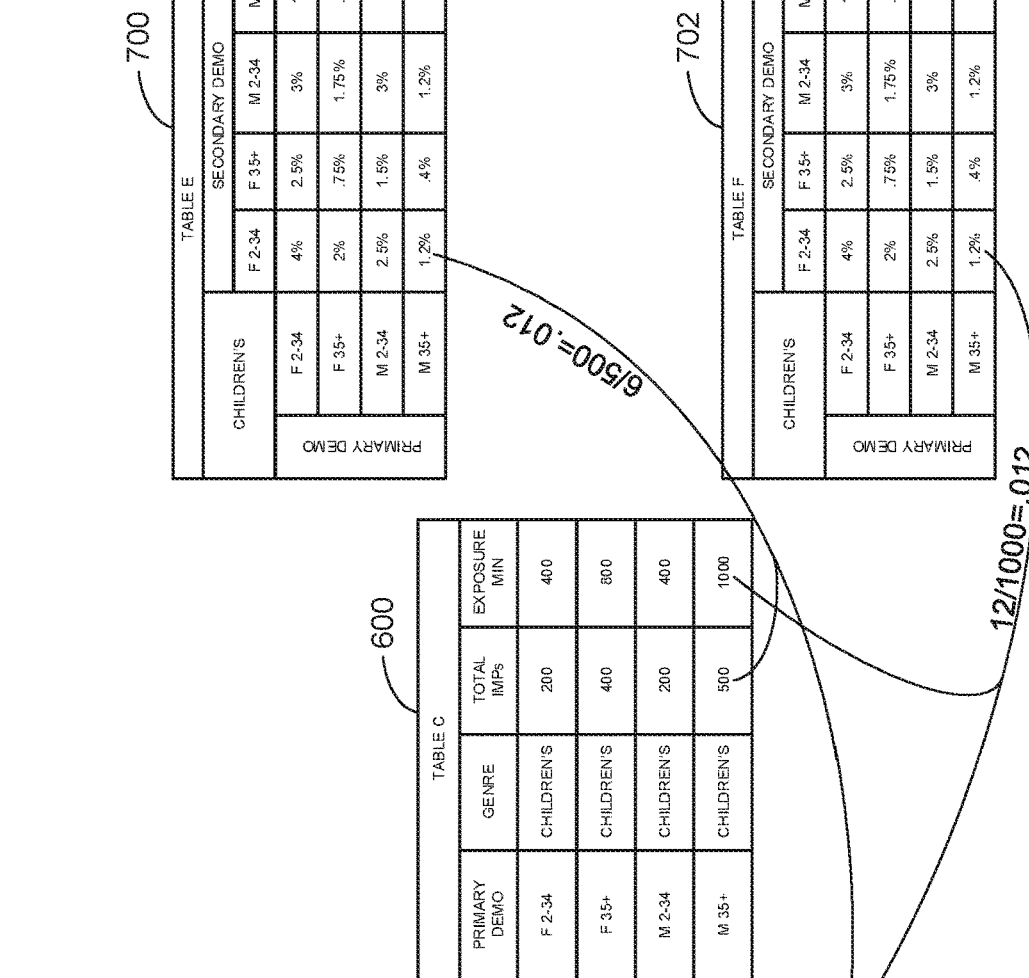
FIG. 7 depicts the third and the fourth example tables of FIG. 6 and a fifth example table and a sixth example table illustrating co-viewing factor determinations.

In the illustrated example of FIG. 7, the co-viewing calculator 220 calculates that 1.2% of impressions can be credited based on calculating a ratio of (1) 6 co-viewer impressions credited to one or more panelists in the secondary demographic of female age 2-34 when accompanied by a panelist in the primary demographic of male age 35 and older when exposed to media related to a children's media genre as illustrated in Table D 602 and (2) 500 total impressions credited to one or more panelists in a primary demographic of male age 35 and older when exposed to the media as illustrated in Table C 600. As illustrated in Table E 700, the example co-viewing calculator 220 calculates a co-viewing factor for a plurality of primary demographic and secondary demographic combinations based on the information included in Table C 600 and Table D 602.

Figure 8:
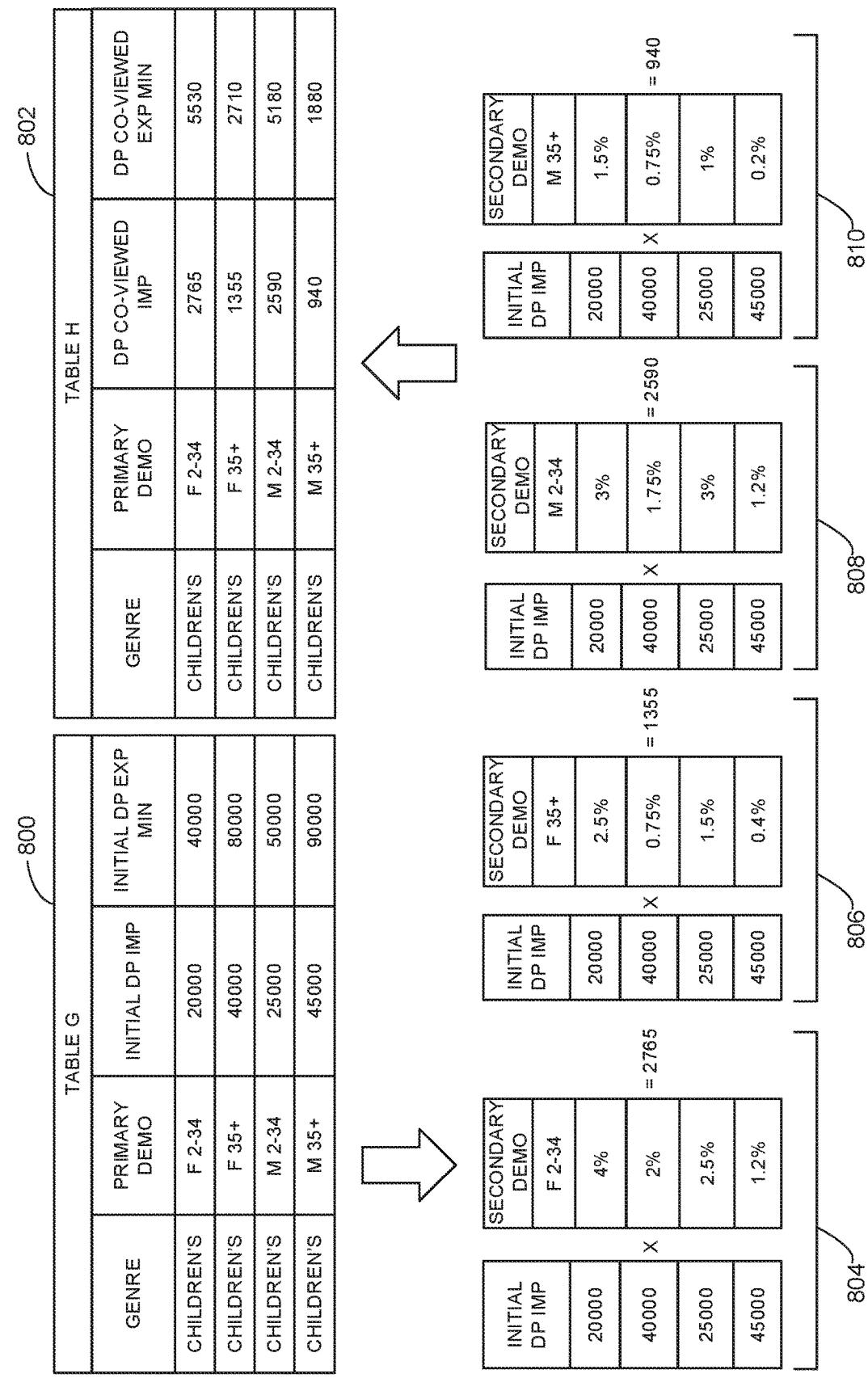
FIG. 8 depicts a seventh example table and an eighth example table illustrating census co-viewing impression and census exposure time determinations.

At block 312, the example co-viewing exposure generator 160 determines a number of census viewer impressions. For example, the data extractor 210 may determine a number of census viewer impressions credited to users exposed to media related to a children's media genre for a plurality of demographics. For example, the user may be utilizing a service provided by the demographic provider 170 when exposed to the media. For example, as illustrated in FIG. 8, the data extractor 210 determines information included in Table G 800 based on at least a media genre (GENRE), a primary demographic of the user (PRIMARY DEMO), and an initial total number of demographic provider impressions (INITIAL DP IMP). In the illustrated example, the data extractor 210 categorizes, filters, sorts, etc., the media monitoring information obtained from the demographic provider 170 of FIG. 1 to generate the information included in Table G 800. For example, as illustrated in Table G 800, the data extractor 210 determines that there are 20,000 impressions credited to one or more users in a primary demographic of female (F) age 2-34 when exposed to media corresponding to a children's media genre.

At block 314, the example co-viewing exposure generator 160 calculates a number of census co-viewer impressions based on the co-viewing factors. For example, the impression calculator 230 may multiply the number of census viewer impressions for a demographic by the corresponding co-viewing factor for a plurality of demographics. In the illustrated example of FIG. 8, the impression calculator 230 determines a number of impressions credited to secondary viewers when accompanied by a primary viewer in a primary demographic as illustrated in Table H 802. For example, the impression calculator 230 may calculate the number of census co-viewer impressions for one or more demographics by executing a dot product operation. For example, as illustrated in a first dot product operation 804 of FIG. 8, the impression calculator 230 determines a number of co-viewer impressions credited to one or more panelists in a secondary demographic (SECONDARY DEMO) based on the initial total demographic provider impressions and the co-viewing factors for the secondary demographic.

For example, as illustrated in the first dot product operation 804, the impression calculator 230 calculates 2765 impressions credited to secondary viewers in the secondary demographic of female age 2-34 when accompanied by a primary viewer in the primary demographics of female age 2-34, female age 35 and older, male age 2-34, and male age 35 and older. Likewise, the impression calculator 230 calculates 1355 impressions credited to co-viewers in the secondary demographic of female age 35 and older in a second dot product operation 806. Similarly, the impression calculator 230 calculates 2590 impressions credited to co-viewers in the secondary demographic of male age 2-34 in a third dot product operation 808. In addition, the impression calculator 230 calculates 940 impressions credited to co-viewers in the secondary demographic of male age 35 and older in a fourth dot product operation 810.

At block 316, the example co-viewing exposure generator 160 calculates an aggregate impression total. For example, the data aggregator 250 may determine a sum of the number of census viewer impressions obtained from the demographic provider 170 and the number of census co-viewer impressions calculated by the impression calculator 230. For example, as illustrated in Table J of FIG. 9, the data aggregator 250 determines a number of total adjusted demographic provider impressions (ADJUSTED DP IMP) based on a sum of (1) the initial demographic provider impressions illustrated in Table G 800 of FIGS. 8-9 and (2) the demographic provider co-viewer impressions illustrated in Table H 802 of FIGS. 8-9.

At block 318, the example co-viewing exposure generator 160 generates a report. For example, the report generator 260 may prepare a report crediting panelists in a demographic for being presented media (e.g., media related to a media genre). For example, the report may include a number of impressions credited to primary viewers in a primary demographic. In another example or the same example, the report may include a number of co-viewer impressions credited to secondary viewers in a secondary demographic when presented the media while accompanied by the primary viewer in the primary demographic. In yet another example or the same example, the report generator 260 may generate a report which includes a subset or an entirety of the information included in Table J 900 of FIG. 9. The example report generator 260 may transmit the report to reporting servers, census data aggregation servers, operation analyzers, etc., to improve an accuracy of media monitoring by adjusting for co-viewer impressions. The example program 300 then concludes.

FIG. 4 is a flowchart representative of example machine readable instructions which may be executed to implement the co-viewing exposure generator 160 of FIGS. 1-2 to calculate an aggregate exposure time total. The example program 400 of FIG. 4 begins at block 402 when the example co-viewing exposure generator 160 obtains exposure information from panelist viewers. For example, the co-viewing exposure generator 160 may obtain media monitoring information including a number of exposure minutes credited to panelists exposed to media related to a media genre from the meter 105 of FIG. 1. For example, a panelist may be prompted to identify if multiple people are present prior to presenting media. In such an example, a main user may select the main user and/or additional people that are present for exposure to the presented media as illustrated in FIG. 10. For example, in connection with the illustrated example of FIG. 10, the main user Mary Doe may identify Mary Doe as a primary viewer and/or John Doe and/or Jane Doe as secondary viewers or co-viewers of the presented media. As a result, logged exposure minutes may be credited to the main user Mary Doe and/or one or more of the selected co-viewers.

At block 404, the example co-viewing exposure generator 160 obtains census exposure information from a demographic provider. For example, the communication interface 200 may obtain media monitoring information including a number of exposure minutes from the demographic provider 170 of FIG. 1.

At block 406, the example co-viewing exposure generator 160 determines exposure time for panelist viewers. For example, the data extractor 210 may determine a number of minutes credited to primary viewers exposed to media, where the primary viewers belong to a first demographic or a first demographic group based on the obtained media monitoring information. For example, the data extractor 210 may categorize, filter, sort, etc., information in the obtained media monitoring information as illustrated in Table A 500 of FIG. 5. The example data extractor 210 categorizes exposure information based on at least demographics of a primary viewer (PRIMARY DEMO) and a media genre (GENRE). In the illustrated example of Table A 500, the data extractor 210 determines a number of total exposure minutes (EXPOSURE MIN) corresponding to each of the primary viewer demographics and the media genres listed in the Table A 500. For example, as illustrated in Table A 500, the data extractor 210 determines that there are 200 total exposure minutes credited to one or more primary viewers in the primary demographic of female age 2-5 exposed to media related to a children's media genre.

At block 408, the example co-viewing exposure generator 160 determines exposure time for panelist co-viewers. For example, the data extractor 210 may determine a number of minutes credited to secondary viewers exposed to the media, where the secondary viewers belong to a second demographic group based on the obtained media monitoring information. In some examples, the second demographic group is different than the first demographic group. In other examples, the first and the second demographic group are the same. For example, the data extractor 210 may categorize, filter, sort, etc., information in the obtained media monitoring information as illustrated in Table B 500 of FIG. 5. The example data extractor 210 categorizes exposure time information based on at least a media genre (GENRE), demographics of a primary viewer (PRIMARY DEMO), and demographics of a secondary viewer (SECONDARY DEMO).

In the illustrated example of Table B 502, the data extractor 210 sorts the information based on (1) the GENRE, (2) the PRIMARY DEMO, and then (3) the SECONDARY DEMO. Alternatively, any other sorting order may be utilized. In the illustrated example of Table B 502, the data extractor 210 determines a number of total co-viewer exposure minutes (CO-VIEWER EXPOSURE MIN) corresponding to a total number of exposure minutes credited to one or more secondary viewers in a secondary demographic when accompanied by a primary viewer in a primary demographic when exposed to media related to a media genre. For example, as illustrated in Table B 502, the data extractor 210 determines that there are 22 exposure minutes credited to one or more secondary viewers in the secondary demographic of female age 2-5 when accompanied by a primary viewer in the primary demographic of male age 65 and older when presented with media related to the children's media genre.

In some examples, the data extractor 210 filters media monitoring information (e.g., exposure time information) of interest. For example, as illustrated in Table C 600 of FIG. 6, the data extractor 210 aggregates a total number of exposure minutes (EXPOSURE MIN) for a media genre (GENRE) and a plurality of demographics of a primary viewer (PRIMARY DEMO). For example, as illustrated in Table C 600, the data extractor 210 determines that there are 400 total exposure minutes credited to one or more primary viewers in the primary demographic of female (F) age 2-34 exposed to media categorized as belonging to a children's media genre. In some examples, the data extractor 210 processes the filtered impression information of interest. For example, as illustrated in Table D 602 of FIG. 6, the data extractor 210 determines a number of exposure minutes by co-viewers (CO-VIEWER EXPOSURE MINs) in a secondary demographic when accompanied by a panelist in a primary demographic when presented media related to a media genre. For example, as illustrated in Table D 602, the data extractor 210 determines that there are 10 co-viewer exposure minutes credited to one or more co-viewers in a secondary demographic of female age 35 and older when accompanied by a panelist in a primary demographic of female age 2-34 when exposed to media related to a children's media genre.

At block 410, the example co-viewing exposure generator 160 calculates co-viewing factors. For example, the co-viewing calculator 220 may calculate a percentage representative of a number of exposure minutes credited to a primary viewer in a primary demographic that may also be credited to a secondary viewer in a secondary demographic. For example, as illustrated in Table F 702 of FIG. 7, the co-viewing calculator 220 calculates that 1.2% of exposure minutes credited to a primary viewer in a primary demographic of male age 35 and older can also be credited to a secondary viewer in a secondary demographic of female age 2-34 when exposed to media related to a children's media genre.

In the illustrated example of FIG. 7, the co-viewing calculator 220 calculates that 1.2% of exposure minutes can be credited based on calculating a ratio of (1) 12 co-viewer exposure minutes credited to one or more panelists (e.g., co-viewers, secondary viewers, etc.) in the secondary demographic of female age 2-34 when accompanied by a panelist (e.g., primary viewer, main user, etc.) in the primary demographic of male age 35 and older when exposed to media related to a children's media genre as illustrated in Table D 602 and (2) 1000 total exposure minutes credited to one or more panelists in a primary demographic of male age 35 and older when exposed to the media as illustrated in Table C 600. As illustrated in Table F 702, the example co-viewing calculator 220 calculates a co-viewing factor for a plurality of primary demographic and secondary demographic combinations based the information included in Table C 600 and Table D 602.

At block 412, the example co-viewing exposure generator 160 determines exposure time for census viewers. For example, the data extractor 210 may determine a number of exposure minutes credited to users exposed to media related to a children's media genre for a plurality of demographics. For example, the user may be utilizing a service provided by the demographic provider 170 when exposed to the media. For example, as illustrated in FIG. 8, the data extractor 210 determines information included in Table G 800 based on at least a media genre (GENRE), a primary demographic of the user (PRIMARY DEMO), and an initial total number of demographic provider exposure minutes (INITIAL DP EXP MIN). In the illustrated example, the data extractor 210 categorizes, filters, sorts, etc., the media monitoring information obtained from the demographic provider 170 of FIG. 1 to generate the information included in Table G 800. For example, as illustrated in Table G 800, the data extractor 210 determines that there are 40,000 exposure minutes credited to one or more users in a primary demographic of female (F) age 2-34 when exposed to media corresponding to a children's media genre.

At block 414, the example co-viewing exposure generator 160 calculates exposure time for census co-viewers based on the co-viewing factors. For example, the exposure time calculator 240 may multiply the number of census viewer exposure minutes for a demographic by the corresponding co-viewing factor for a plurality of demographics. In the illustrated example of FIG. 8, the exposure time calculator 240 determines a number of exposure minutes credited to secondary viewers when accompanied by a primary viewer in a primary demographic as illustrated in Table H 802. For example, the impression calculator 230 may calculate the number of census co-viewer impressions for one or more demographics by executing a dot product operation. For example, the exposure time calculator 240 may calculate a number of demographic provider co-viewer exposure minutes in a similar manner (e.g., via a dot product operation) as describe above in connection with block 314. For example, as illustrated in Table H 802, the exposure time calculator 240 calculates that there are 2710 exposure minutes credited to one or more secondary viewers in a secondary demographic of female age 2-34 when accompanied by a primary viewer in a primary demographic of female age 35 and older based on a dot product operation similar to the first through the fourth dot product operations 804, 806, 808, 810.

At block 416, the example co-viewing exposure generator 160 calculates an aggregate exposure time total. For example, the data aggregator 250 may determine a sum of the number of census viewer exposure minutes obtained from the demographic provider 170 and the number of census co-viewer exposure minutes calculated by the exposure time calculator 240. For example, as illustrated in Table J of FIG. 9, the data aggregator 250 determines a number of total adjusted demographic provider exposure minutes (ADJUSTED DP EXP MIN) based on a sum of (1) the initial demographic provider exposure minutes illustrated in Table G 800 of FIGS. 8-9 and (2) the demographic provider co-viewer exposure minutes illustrated in Table H 802 of FIGS. 8-9.

At block 418, the example co-viewing exposure generator 160 generates a report. For example, the report generator 260 may prepare a report crediting panelists in a demographic for being presented media (e.g., media related to a media genre). For example, the report may include a number of exposure minutes credited to primary viewers in a primary demographic. In another example or the same example, the report may include a number of co-viewer exposure minutes credited to secondary viewers in a secondary demographic when presented the media while accompanied by the primary viewer in the primary demographic. In yet another example or the same example, the report generator 260 may generate a report which includes a subset or an entirety of the information included in Table J 900 of FIG. 9. The example report generator 260 may transmit the report to reporting servers, census data aggregation servers, operation analyzers, etc., to improve an accuracy of media monitoring by adjusting for co-viewer exposure minutes. The example program 400 then concludes.

FIG. 10 depicts an example graphical user interface 1000 used to identify primary viewers and/or secondary viewers of presented media. The example graphical user interface 1000 is a display prompt of an on screen people meter operating on one of the media devices 115, 120, 125, 130, 135 of FIG. 1. In the illustrated example, a main user can select a LOG IN button 1002 to log in using credentials provided by the AME (e.g., credentials generated and supplied to the main user when the main user registered with the AME to become a panelist) to initiate a metering session. The main user is identified in a main user identification pane 1004. The main user identification pane identifies a primary panelist, a primary viewer, etc. In the illustrated example, the main user is identified as Mary Doe. As a result, the AME may credit logged impressions and/or logged exposure minutes to one or more demographic categories or demographic groups corresponding to Mary Doe.

In the illustrated example, the main user can select the main user and/or additional people. In the illustrated example, the main user can select the main user as depicted by a first slider identification button 1006. The first slider identification button 1006 displays a vertical line when Mary Doe is using the media device and displays a circle when Mary Doe is not using the media device (e.g., not exposed to media presented on the media device). Likewise, the main user may adjust a second slider identification button 1008 and/or a third slider identification button 1010 to identify co-viewers. For example, the main user may adjust the second slider identification button 1008 to identify John Doe as either (1) the only user using the media device, or (2) using the media device with another user (e.g., the main user, another co-viewer, etc., and/or a combination thereof). For example, as illustrated in FIG. 10, the main user may adjust the second slider identification button 1008 to indicate that John Doe is co-viewing presented media with the main user Mary Doe.

Figure 11:
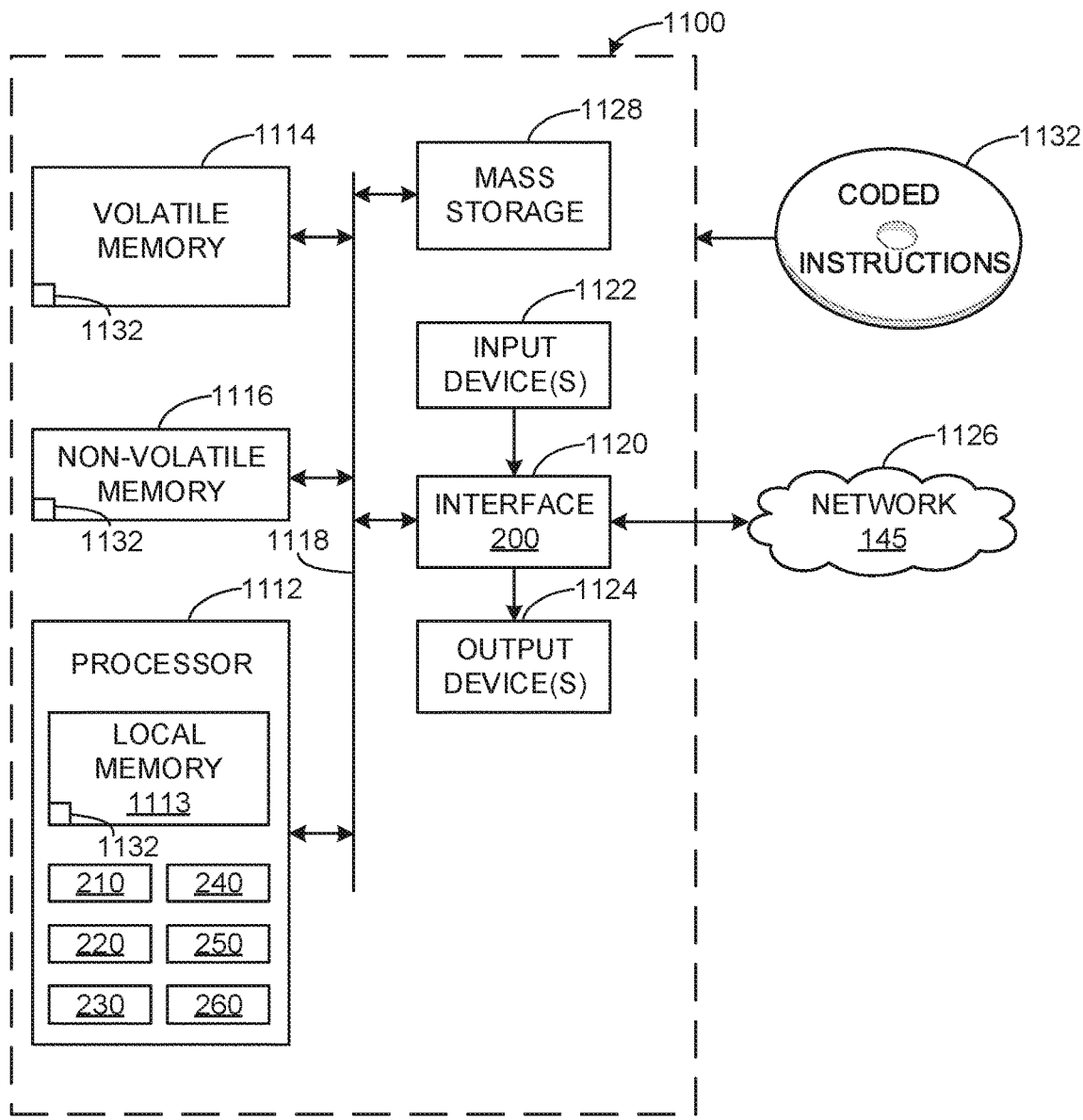
FIG. 11 is a block diagram of an example processor platform structured to execute machine readable instructions to implement the methods of FIGS. 3-4 and/or the example co-viewing exposure generator of FIGS. 1-2.

FIG. 11 is a block diagram of an example processor platform 1100 capable of executing the instructions of FIGS. 3-4 to implement the co-viewing exposure generator 160 of FIGS. 1-2. The processor platform 1100 can be, for example, a server or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. The hardware processor may be a semiconductor based (e.g., silicon based) device. In this example, the processor 1112 implements the example data extractor 210, the example co-viewing calculator 220, the example impression calculator 230, the example exposure time calculator 240, the example data aggregator 250, and the example report generator 260.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a peripheral component interconnect (PCI) express interface. The interface circuit 1120 implements the communication interface 200.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip, and/or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.). The network implements the example network 145 of FIG. 1.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and DVD drives.

The coded instructions 1132 of FIGS. 3-4 may be stored in the mass storage device 1128, in the volatile memory 1114, in the non-volatile memory 1116, and/or on a removable non-transitory computer readable storage medium such as a CD or DVD.

From the foregoing, it will be appreciated that the above disclosed methods, apparatus, and articles of manufacture monitor media exposed to viewers and/or co-viewers. The number of co-viewers for a general population such as, for example, a census population, may be determined based on calculated co-viewing factors disclosed above. It will be appreciated that the co-viewing factors are calculated based on obtained panelist data to align more accurately the obtained panelist data and/or obtained census data with actual media consumption behavior. By implementing the above disclosed methods, apparatus, and articles of manufacture, an audience measurement entity can improve memory and processor utilization (e.g., increase available memory storage and/or calculation resources) due to installing metering devices on a subset of media devices compared to installing a metering device on every media device to account for co-viewing behavior.

Although certain example methods, apparatus, and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computing system comprising:
a processor; and
a non-transitory computer-readable storage medium, having stored thereon program instructions that, upon execution by the processor, cause performance of a set of operations comprising:
 accessing, with a media device, media from a media provider, wherein the media device is associated with a first panelist of a panel, and wherein the access is based on first credentials associated with the first panelist;
 launching a user interface on a first meter on the media device, wherein the user interface prompts the first panelist exposed to the media to identify one or more persons exposed to the media with the first panelist, the user interface including a first identifier corresponding to the first panelist and a second identifier corresponding to a first person of the one or more persons, the first identifier and the second identifier associated with respective demographics of the first panelist and the first person;
 capturing, after a login to the user interface based on second credentials associated with the first panelist, first panelist identification information, the first panelist identification information including the first identifier and the second identifier; and
 capturing, using the first meter, first exposure information based on first time quantities that the media is exposed to the first panelist and the first person, the first exposure information including a media genre associated with content of the media;
 aggregating second panelist identification information and second exposure information from a plurality of second meters associated with a plurality of panelists, the second panelist identification information including the first panelist identification information, the second exposure information including the first exposure information, the plurality of the second meters including the first meter, the plurality of the panelists including the first panelist, the second exposure information including the media genre associated with the media; and
 obtaining census exposure information based on second time quantities that the media is exposed to census viewers while the census viewers are accessing a service hosted by a demographic provider, the census exposure information different from the second exposure information, the census exposure information different from the first exposure information, the census exposure information obtained from a server different from the first meter, the census exposure information including the media genre associated with the media;
 calculating a co-viewing factor corresponding to the media genre and a demographic of the plurality of the panelists based on the second exposure information and the second panelist identification information;
 calculating a number of census co-viewer exposure minutes using a dot product calculation on the census exposure information and the co-viewing factor corresponding to the media genre;

determining an aggregate exposure time total, wherein the aggregate exposure time total is a sum of the calculated number of census co-viewer exposure minutes and exposure minutes corresponding to the second time quantities of the census exposure information; and generating a report including the aggregate exposure time total, the media genre, the demographic, and a total number of impressions associated with the demographic, the report to indicate crediting ones of the plurality of the panelists in the demographic with a presentation of the media.

2. The computing system of claim 1, wherein the first exposure information is obtained from the first meter from a first network, and wherein the census exposure information is obtained from the server from a second network.

3. The computing system of claim 2, wherein the second exposure information from the plurality of the panelists includes a number of co-viewer exposure minutes credited to one or more of the plurality of the panelists in a first demographic when accompanied by a second panelist of the plurality of the panelists in a second demographic.

4. The computing system of claim 2, wherein the media is first media, wherein the user interface is a first user interface, wherein the census exposure information includes a number of exposure minutes credited to users in a demographic presented with second media corresponding to the media genre, and wherein the users access the service provided by the demographic provider by at least one of logging into the service or accessing a second user interface of the service.

5. The computing system of claim 1, wherein the media is first media, and wherein the co-viewing factor is based on a ratio of (1) a number of co-viewer exposure minutes credited to first ones of the plurality of the panelists in a first demographic when accompanied by a third one of the plurality of the panelists in a second demographic exposed to second media related to the media genre, and (2) a number of exposure minutes credited to second ones of the plurality of the panelists in a second demographic exposed to the second media.

6. The computing system of claim 5, wherein calculating the number of census co-viewer exposure minutes for a first demographic comprises executing a dot product operation on (1) a number of census exposure minutes credited to first ones of the plurality of the panelists in the first demographic presented with second media related to the media genre and (2) a co-viewing factor corresponding to a coviewer in a second demographic accompanying one of the first ones of the plurality of the panelists in the first demographic presented with the second media.

7. The computing system of claim 5, wherein calculating the number of census co-viewer exposure minutes for a plurality of demographics comprises executing a plurality of dot product operations on (1) a total number of census exposure minutes credited to first ones of the plurality of the panelists in a first demographic presented with second media corresponding to the media genre and (2) a respective co-viewing factor corresponding to a co-viewer in a respective demographic accompanying one of the first ones of the plurality of the panelists in the first demographic presented with the second media.

8. The computing system of claim 1, the set of operations further comprising:

determining the exposure time total associated with the census exposure information; and determining the exposure time total associated with the number of census co-viewer exposure minutes for the media associated with the media genre.

9. A method to monitor media, the method comprising:

accessing, with a media device, media from a media provider, the media device associated with a first panelist of a panel, the access based on first credentials associated with the first panelist, the panel including panelists of a plurality of households that are selected by and monitored by an audience measurement entity;

launching a user interface on a first meter on the media device, the user interface to prompt the first panelist exposed to the media to identify one or more persons exposed to the media with the first panelist, the user interface including a first identifier corresponding to the first panelist and a second identifier corresponding to a first person of the one or more persons, the first identifier and the second identifier associated with respective demographics of the first panelist and the first person;

after a login to the user interface based on second credentials associated with the first panelist, capturing, with the first meter, first panelist identification information including the first identifier and the second identifier;

capturing, with the first meter, first exposure information based on first time quantities that the media is exposed to the first panelist and the first person, the first exposure information including a media genre associated with content of the media;

aggregating second panelist identification information and second exposure information from a plurality of second meters associated with a plurality of panelists, the second panelist identification information including the first panelist identification information, the second exposure information including the first exposure information, the plurality of the second meters including the first meter, the plurality of the panelists including the first panelist, the second exposure information including the media genre associated with the media;

obtaining census exposure information based on second time quantities that the media is exposed to census viewers while the census viewers are accessing a service hosted by a demographic provider, the census exposure information different from the second exposure information, the census exposure information different from the first exposure information, the census exposure information corresponding to at least one user not included in the panel, the census exposure information obtained from a server different from the first meter, the census exposure information including the media genre associated with the media;

calculating, by executing an instruction with a processor, a co-viewing factor corresponding to the media genre and a demographic of the plurality of the panelists based on the second exposure information and the second panelist identification information;

calculating, by executing an instruction with the processor, a number of census co-viewer exposure minutes using a dot product calculation on the census exposure information and the co-viewing factor corresponding to the media genre;

determining, by executing an instruction with the processor, an aggregate exposure time total, wherein the aggregate exposure time total is a sum of the calculated number of census co-viewer exposure minutes and exposure minutes corresponding to the second time quantities of the census exposure information; and generating, by executing an instruction with the processor, a report including the aggregate exposure time total, the media genre, the demographic, and a total number of impressions associated with the demographic, the report to indicate crediting ones of the plurality of the panelists in the demographic with presentation of the media.

10. The method of claim 9, further comprising:
obtaining the first exposure information from the first meter from a first network; and
obtaining the census exposure information from the server from a second network.

11. The method of claim 10, wherein the second exposure information from the plurality of the panelists includes a number of co-viewer exposure minutes credited to one or more of the plurality of the panelists in a first demographic when accompanied by a second panelist of the plurality of the panelists in a second demographic.

12. The method of claim 10, wherein the media is first media, wherein the user interface is a first user interface, wherein the census exposure information includes a number of exposure minutes credited to users in a demographic presented with second media corresponding to the media genre, and wherein the users access the service provided by the demographic provider by at least one of logging into the service or accessing a second user interface of the service.

13. The method of claim 9, wherein the media is first media, and wherein the co-viewing factor is based on a ratio of (1) a number of co-viewer exposure minutes credited to first ones of the plurality of the panelists in a first demographic when accompanied by a third one of the plurality of the panelists in a second demographic exposed to second media related to the media genre, and (2) a number of exposure minutes credited to second ones of the plurality of the panelists in a second demographic exposed to the second media.

14. The method of claim 13, wherein the calculating of the number of census co-viewer exposure minutes for a first demographic includes executing a dot product operation on (1) a number of census exposure minutes credited to first ones of the plurality of the panelists in the first demographic presented with second media related to the media genre and (2) a co-viewing factor corresponding to a co-viewer in a second demographic accompanying one of the first ones of the plurality of the panelists in the first demographic presented with the second media.

15. The method of claim 13, wherein calculating the number of census co-viewer exposure minutes for a plurality of demographics comprises executing a plurality of dot product operations on (1) a total number of census exposure minutes credited to first ones of the plurality of the panelists in a first demographic presented with second media corresponding to the media genre and (2) a respective co-viewing factor corresponding to a co-viewer in a respective demographic accompanying one of the first ones of the plurality of the panelists in the first demographic presented with the second media.

16. At least one non-transitory computer-readable storage medium comprising instructions which, when executed, cause at least one processor to at least:
launch, in response to accessing media from a media provider on a first media device, a user interface to prompt a first panelist of a panelist to identify one or more persons exposed to media with the first panelist, the access based on first credentials associated with the first panelist, the user interface including a first identifier corresponding to the first panelist and a second identifier corresponding to a first person of the one or more persons, the first identifier and the second identifier associated with respective demographics of the first panelist and the first person;

after a login to the user interface based on second credentials associated with the first panelist, capture, using a first meter associated with the media device, first panelist identification information including the first identifier and the second identifier; and capture first exposure information based on first time quantities that the media is exposed to the first panelist and the first person, the first exposure information including a media genre associated with content of the media;

aggregate second panelist identification information and second exposure information from a plurality of second meters, the plurality of the second meters associated with a plurality of panelists, the second panelist identification information including the first panelist identification information, the second exposure information including the first exposure information, the plurality of the second meters including the first meter, the plurality of the panelists including the first panelist, the second exposure information including the media genre associated with the media;

obtain census exposure information based on second time quantities that the media is exposed to census viewers while the census viewers are accessing a service hosted by a demographic provider, the census exposure information different from the second exposure information, the census exposure information different from the first exposure information, the census exposure information obtained from a server different from the first meter, the census exposure information including the media genre associated with the media;

calculate a co-viewing factor corresponding to the media genre and a demographic of the plurality of the panelists based on the second exposure information and the second panelist identification information;

calculate a number of census co-viewer exposure minutes using a dot product calculation on the census exposure information and the co-viewing factor corresponding to the media genre;

determine an aggregate exposure time total, wherein the aggregate exposure time total is a sum of the calculated number of census co-viewer exposure minutes and exposure minutes corresponding to the second time quantities of the census exposure information;

and generate a report including the aggregate exposure time total, the media genre, the demographic, and a total number of impressions associated with the demographic, the report to indicate crediting ones of the plurality of the panelists in the demographic with presentation of the media.

17. The non-transitory computer-readable storage medium of claim 16, wherein the instructions, when executed, cause the at least one processor to at least obtain the first exposure information from the first meter from a first network and obtain the census exposure information from the server from a second network.

18. The non-transitory computer-readable storage medium of claim 17, wherein the second exposure information from the plurality of the panelists includes a number of co-viewer exposure minutes credited to one or more panelists in a first demographic when accompanied by a second panelist of the plurality of the panelists in a second demographic.

19. The non-transitory computer-readable storage medium of claim 17, wherein the media is first media, the user interface is a first user interface, wherein the census exposure information includes a number of exposure minutes credited to users in a demographic presented with second media corresponding to the media genre, and wherein the users access the service provided by the demographic provider by at least one of logging into the service or accessing a second user interface of the service.

\* \* \* \* \*